United States Patent
Jang et al.

(10) Patent No.: US 8,902,388 B2
(45) Date of Patent: *Dec. 2, 2014

(54) DISPLAY DEVICE HAVING A DOMAIN-FORMING LAYER WITH A DEPRESSION PATTERN AND METHOD OF MANUFACTURING THE SAME

(75) Inventors: Yong-Kyu Jang, Hwaseong-si (KR); Jae-Young Lee, Yongin-si (KR); Seong-Jun Lee, Seoul (KR); Yi Li, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 1346 days.

This patent is subject to a terminal disclaimer.

(21) Appl. No.: 12/635,258

(22) Filed: Dec. 10, 2009

(65) Prior Publication Data

US 2010/0201931 A1 Aug. 12, 2010

(30) Foreign Application Priority Data

Feb. 9, 2009 (KR) .................. 10-2009-0010026

(51) Int. Cl.
*G02F 1/1335* (2006.01)
*G02F 1/1333* (2006.01)
*G02F 1/141* (2006.01)
*G02F 1/1343* (2006.01)
*G02F 1/1362* (2006.01)
*G02F 1/1337* (2006.01)
*G02F 1/139* (2006.01)
*G02F 1/137* (2006.01)

(52) U.S. Cl.
CPC ............. *G02F 1/136227* (2013.01); *G02F 2001/133746* (2013.01); *G02F 1/133707* (2013.01); *G02F 1/1393* (2013.01); *G02F 2001/13775* (2013.01)
USPC ............ 349/139; 349/106; 349/110; 349/135

(58) Field of Classification Search
USPC ................................. 349/110, 106, 139, 155
See application file for complete search history.

(56) References Cited

U.S. PATENT DOCUMENTS

| | | | |
|---|---|---|---|
| 5,953,091 A | 9/1999 | Jones et al. | |
| 7,697,099 B2 * | 4/2010 | Kume et al. | 349/138 |
| 7,978,298 B2 * | 7/2011 | Saitoh et al. | 349/156 |

(Continued)

FOREIGN PATENT DOCUMENTS

| | | |
|---|---|---|
| CN | 101233447 | 7/2008 |
| JP | 2001-174821 | 6/2001 |

(Continued)

*Primary Examiner* — Huyen Ngo
(74) *Attorney, Agent, or Firm* — H.C. Park & Associates, PLC

(57) ABSTRACT

A display device may include a first substrate, a second substrate, and a liquid crystal layer. The first substrate may include a domain-forming layer including a depression pattern for forming a liquid crystal domain in a pixel area and a pixel electrode formed on the domain-forming layer. The second substrate may face the first substrate. The second substrate may include a common electrode formed on the entire surface thereof. The liquid crystal layer may be disposed between the first substrate and the second substrate. The liquid crystal layer may include a reactive mesogen (RM) which fixes liquid crystal molecules formed in the liquid crystal domain. Since a liquid crystal domain may be formed without a separate pattern on a common electrode, a display device having an enhanced aperture ratio and an enhanced viewing angle may be manufactured.

11 Claims, 20 Drawing Sheets

(56) References Cited

U.S. PATENT DOCUMENTS

| | | | |
|---|---|---|---|
| 7,995,170 B2* | 8/2011 | Onishi et al. | 349/114 |
| 8,355,110 B2* | 1/2013 | Kim et al. | 349/183 |
| 8,537,328 B2* | 9/2013 | Lee et al. | 349/192 |
| 2005/0225704 A1* | 10/2005 | Tashiro et al. | 349/113 |
| 2005/0231665 A1* | 10/2005 | Tashiro et al. | 349/113 |
| 2006/0279502 A1 | 12/2006 | Chang | |
| 2007/0002234 A1* | 1/2007 | Nam et al. | 349/122 |
| 2009/0201455 A1* | 8/2009 | Murai | 349/139 |
| 2010/0304015 A1 | 12/2010 | Kim et al. | |
| 2011/0221990 A1* | 9/2011 | Lee et al. | 349/41 |
| 2011/0222010 A1* | 9/2011 | Lee et al. | 349/139 |
| 2011/0222012 A1* | 9/2011 | Park et al. | 349/143 |

FOREIGN PATENT DOCUMENTS

| | | |
|---|---|---|
| JP | 2003-177384 | 6/2003 |
| JP | 2003-177408 | 6/2003 |
| JP | 2003-207641 | 7/2003 |
| JP | 2005-003916 | 1/2005 |
| JP | 2005-018090 | 1/2005 |
| JP | 2005-157224 | 6/2005 |
| JP | 2006-243494 | 9/2006 |
| KR | 10-2002-0010211 | 2/2002 |
| KR | 10-2003-0030741 | 4/2003 |
| KR | 10-2008-0049383 | 6/2008 |
| WO | 2006101083 | 9/2006 |
| WO | 2007108268 | 9/2007 |

* cited by examiner

DISPLAY DEVICE HAVING A DOMAIN-FORMING LAYER WITH A DEPRESSION PATTERN AND METHOD OF MANUFACTURING THE SAME

CROSS REFERENCE TO RELATED APPLICATION

This application claims priority from and the benefit of Korean Patent Application No. 10-2009-0010026, filed on Feb. 9, 2009, which is hereby incorporated for all purposes as if fully set forth herein.

BACKGROUND OF THE INVENTION

1. Field of the Invention

Exemplary embodiments of the present invention relate to liquid crystal display devices and methods of manufacturing the same.

2. Description of the Background

Generally, a liquid crystal display (LCD) panel may include an array substrate, an opposite substrate facing the array substrate, and a liquid crystal layer interposed between the array substrate and the opposite substrate. A plurality of switching elements for driving pixel areas may be formed on the array substrate. The LCD panel may display an image by controlling transmissivity when a voltage is applied to the liquid crystal layer interposed between two substrates.

In a patterned vertical alignment (PVA) mode of an LCD device, liquid crystal molecules may be arranged in different directions by using a patterned transmissive electrode to form a liquid crystal domain, so that a viewing angle of the LCD device may be enhanced. To manufacture the PVA-mode LCD device, a process of forming the patterned transmissive electrode may be required. Moreover, in another type of the PVA mode, a protrusion may be formed on the opposite substrate and a common electrode layer may be formed on the opposite substrate on which the protrusion is formed, so that a liquid crystal domain providing an enhanced viewing angle of the LCD device may be formed. However, a separate process for forming the protrusion may be required.

As described above, in order to form a liquid crystal domain in a PVA-mode LCD device, a process of patterning a transmissive electrode and/or a process of forming a protrusion may be performed, thereby leading to a greater number of steps in the manufacturing process of an LCD device. Furthermore, patterning of the transmissive electrode and forming of the protrusion may reduce the aperture ratio of the LCD device. Moreover, in an assembly process of a display substrate and the opposite substrate, misalignment of the display substrate and the opposite substrate may generate misalignment of patterns of the display substrate's pixel electrode and the opposite substrate's common electrode, so that a liquid crystal domain is not appropriately formed.

SUMMARY OF THE INVENTION

Exemplary embodiments of the present invention provide a display device and a method of manufacturing the display device with greater manufacturing efficiency and display quality.

Additional features of the invention will be set forth in the description which follows, and in part will be apparent from the description, or may be learned by practice of the invention.

Exemplary embodiments of the present invention disclose a display device comprising a first substrate, a second substrate, and a liquid crystal layer. The first substrate comprises a domain-forming layer comprising a depression pattern to form a liquid crystal domain in a pixel area and a pixel electrode. The second substrate faces the first substrate. The second substrate comprises a common electrode. The liquid crystal layer is disposed between the first substrate and the second substrate. The liquid crystal layer comprises a reactive mesogen (RM) to fix liquid crystal molecules forming a liquid crystal domain.

Other exemplary embodiments of the present invention disclose a display device comprising a first substrate, a second substrate, and a liquid crystal layer. The first substrate comprises a pixel electrode having an opening pattern to form a liquid crystal domain on a pixel area. The second substrate faces the first substrate. The second substrate comprises a common electrode. The liquid crystal layer is disposed between the first substrate and the second substrate. The liquid crystal layer comprises a reactive mesogen to fix liquid crystal molecules in the liquid crystal domain.

Other exemplary embodiments of the present invention disclose a method of manufacturing a display device. The method comprises manufacturing a first substrate comprising a domain-forming layer comprising a depression pattern to form a liquid crystal domain in a pixel area and a pixel electrode formed on the domain-forming layer. The method further comprises manufacturing a second substrate facing the first substrate. The second substrate comprises a common electrode. The method further comprises disposing a liquid crystal composition material comprising liquid crystal molecules and reactive mesogen monomers between the first substrate and the second substrate. The method further comprises forming a liquid crystal layer by applying light to the liquid crystal molecules and the reactive mesogen monomers disposed between the first substrate and the second substrate. A first voltage is applied to the common electrode and a second voltage is applied to the pixel electrode.

Other exemplary embodiments of the present invention disclose a method of manufacturing a display device. The method comprises manufacturing a first substrate comprising a pixel electrode having an opening pattern to form a liquid crystal domain in a pixel area. The method further comprises manufacturing a second substrate facing the first substrate. The second substrate comprises a common electrode. The method further comprises forming a liquid crystal layer by applying light to liquid crystal molecules and reactive mesogen monomers disposed between the first substrate and the second substrate. A first voltage is applied to the common electrode and a second voltage is applied to the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
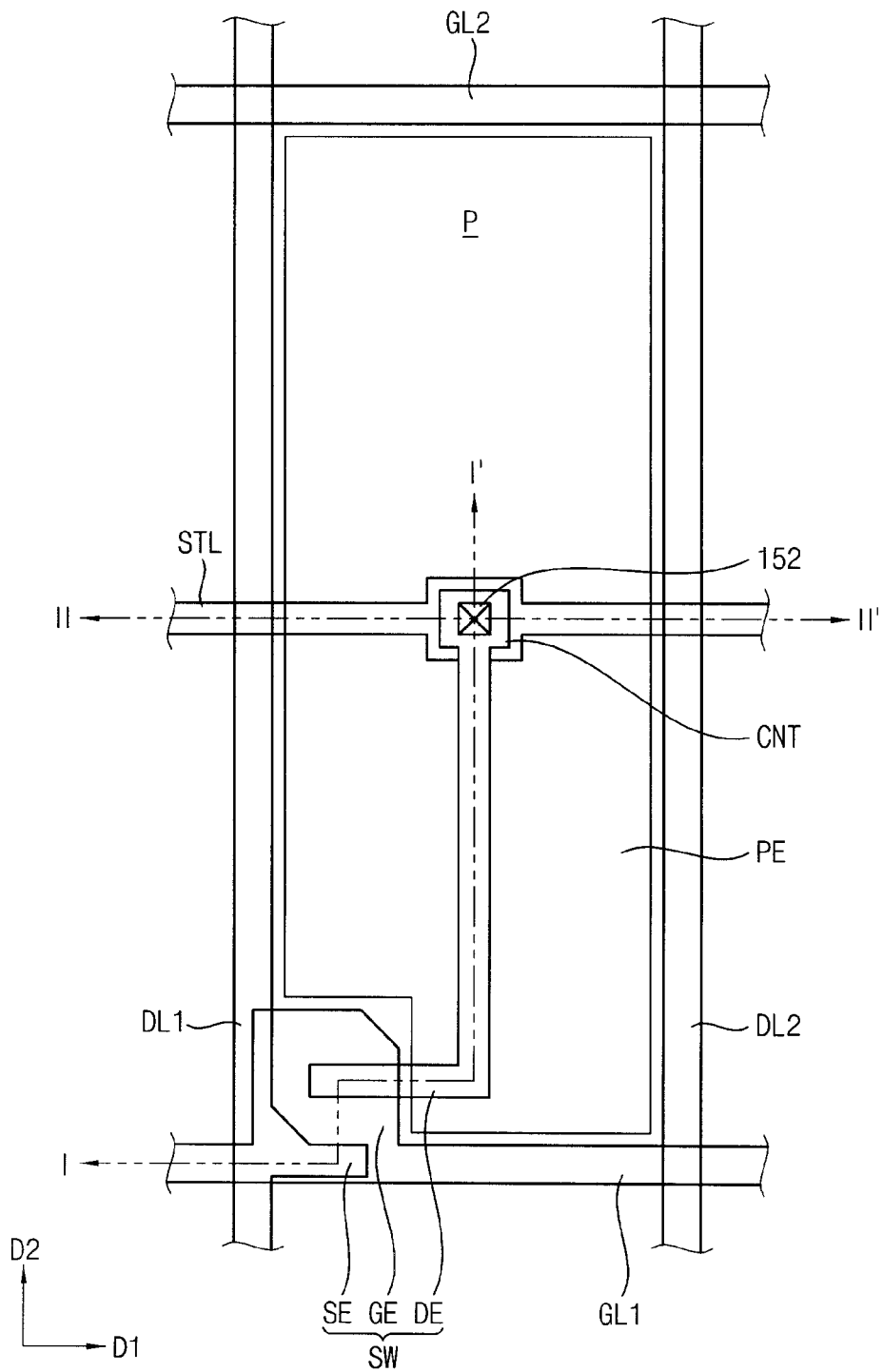
FIG. 1 is a plan view illustrating a display device according to exemplary embodiments of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings and following examples.

EXAMPLE 1

FIG. 1 is a plan view illustrating a display device according to some exemplary embodiments of the present invention.

Figure 2A:
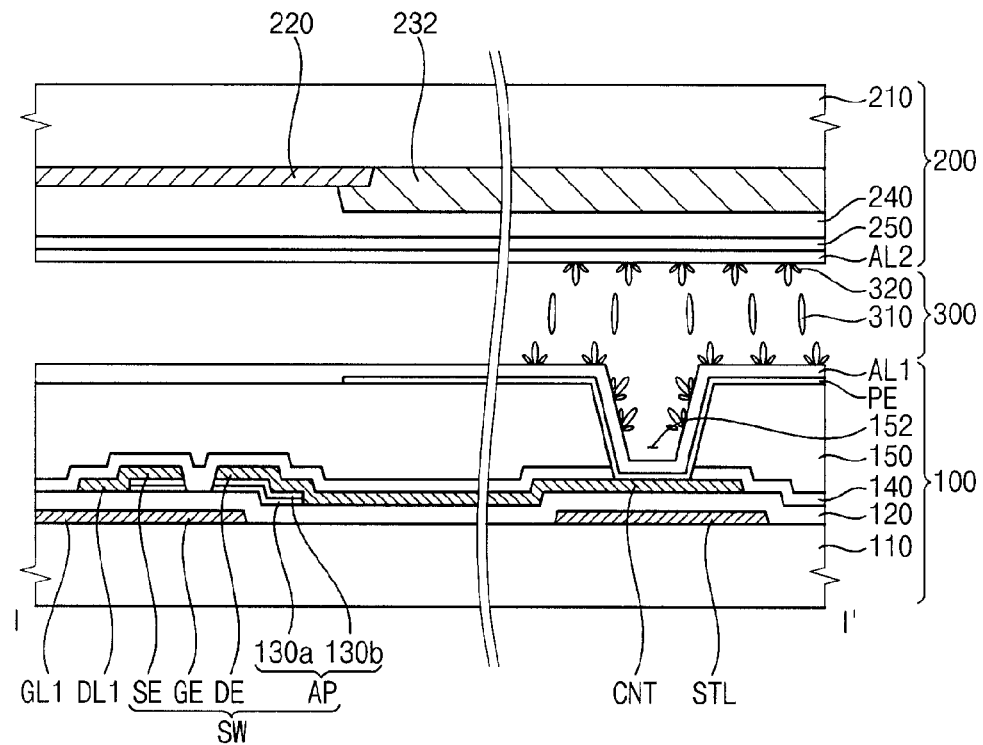
FIG. 2A is a cross-sectional view taken along a line I-I' of FIG. 1.
Figure 2B:
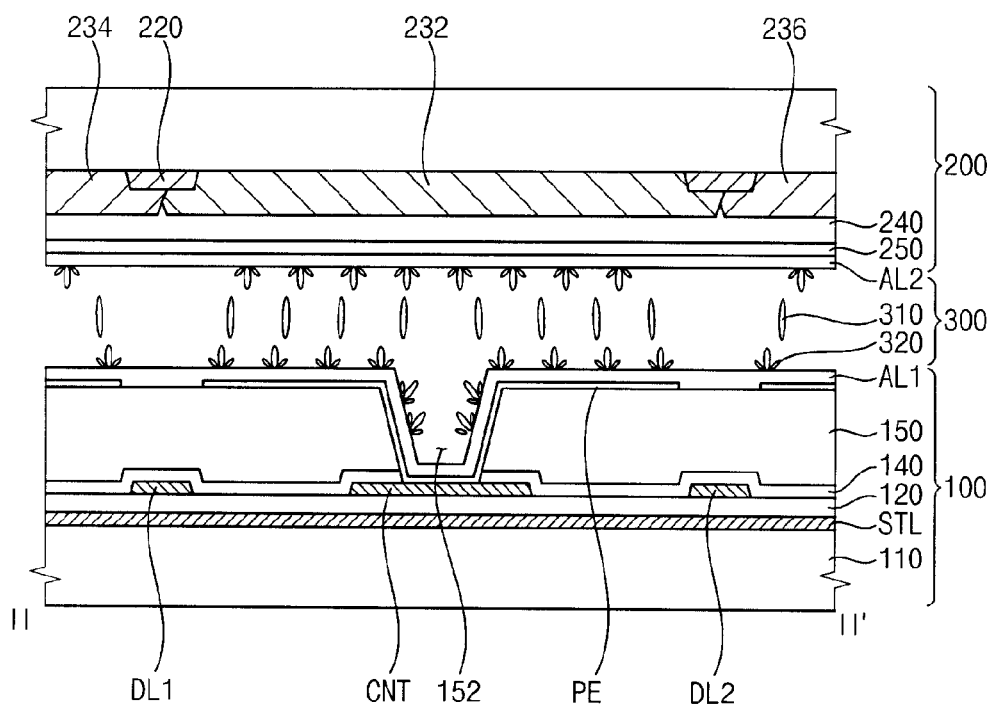
FIG. 2B is a cross-sectional view taken along a line II-II' of FIG. 1.

FIG. 2A is a cross-sectional view taken along a line I-I' of FIG. 1, and FIG. 2B is a cross-sectional view taken along a line II-IF of FIG. 1.

FIG. 2A and FIG. 2B show, states of a reactive mesogen (RM) and liquid crystal molecules of non-electric field in which a voltage is not applied between a pixel electrode and a common electrode.

Referring to FIG. 1, FIG. 2A and FIG. 2B, a display device may include a first substrate 100, a second substrate 200, and a liquid crystal layer 300 interposed between the first substrate 100 and the second substrate 200.

The first substrate 100 may include a first base substrate 110, first and second gate lines GL1 and GL2, a storage line STL, a gate insulation layer 120, first and second data lines DL1 and DL2, a thin-film transistor (TFT) SW that may be a switching element in some cases, a passivation film 140, a domain-forming layer 150, a pixel electrode PE, and a first alignment layer AL1.

The first and second gate lines GL1 and GL2 may be extended along a first direction D1 on the first base substrate 110. In some cases, the first and second gate lines GL1 and GL2 may be arranged in parallel with a second direction D2 that is different from the first direction D1. The second direction D2 may be substantially perpendicular to the first direction D1. The storage line STL may be disposed between the first and second gate lines GL1 and GL2 and may extend along the first direction D1. The gate insulation layer 120 may be formed on the first base substrate 110 to cover the first and second gate lines GL1 and GL2 and the storage line STL. In some cases, the first and second data lines DL1 and DL2 may extend along the second direction D2 on the gate insulation layer 120. In some cases, the first and second data lines DL1 and DL2 may be arranged along the first direction D1 in parallel with each other. The first and second data lines DL1 and DL2 may cross each of the first and second gate lines GL1 and GL2 and the storage line STL. The first substrate 100 may include a plurality of pixel areas P formed by crossing of the first and second gate lines GL1 and GL2 and the first and second data lines DL1 and DL2. The pixel electrode PE may be formed on the pixel areas P.

The TFT SW may include a first gate electrode GE connected to the first gate line GL1; an active pattern AP formed on the gate insulation layer 120; a source electrode SE overlapping, at least partially, the active pattern AP and being connected to the first data line DL1; a drain electrode DE overlapping, at least partially, the pixel area P and being spaced apart from the source electrode SE; and a contact electrode CNT extending from the drain electrode DE to the pixel area P. The TFT SW may include a semiconductor layer 130a and an ohmic contact layer 130b sequentially formed on the gate insulation layer 120. The contact electrode CNT may extend from the drain electrode DE to the storage line STL. The contact electrode CNT may overlap the storage line STL.

The passivation film 140 may be formed on the gate insulation layer 120 to cover the first and second data lines DL1 and DL2, the source electrode SE, the drain electrode DE, and the contact electrode CNT.

The domain-forming layer 150 may be formed on the passivation film 140. The domain-forming layer 150 may planarize the first substrate 100. The domain-forming layer 150 may include a depression pattern 152 that may be depressed from a surface of the domain-forming layer 150 toward the first substrate 110. The depression pattern 152 may be formed in the pixel area P to yield a liquid crystal domain of the pixel area P. The depression pattern 152 may be formed in the domain-forming layer 150 in a dot shape. The depression pattern 152 may extend to the contact electrode CNT. The depression pattern 152 may be a dot-shaped hole, which may expose a portion of the contact electrode CNT. Even though the depression pattern 152 is formed as a dot-shaped hole, light leakage where the depression pattern 152 is formed may be prevented. In some cases, the domain-forming layer 150 may include an organic material. In some cases, the domain-forming layer 150 may include an inorganic material. In some cases, the domain-forming layer 150 may include an organic layer formed from the organic material, an inorganic layer formed from the inorganic material, and the depression pattern 152 formed on the organic layer or the inorganic layer.

The pixel electrode PE may be formed on the domain-forming layer 150 in the pixel area P. The pixel electrode PE may include an optically transparent and electrically conductive material. The pixel electrode PE may be formed to cover the depression pattern 152. In some cases, the entire depression pattern 152 may be covered by the pixel electrode PE. The pixel electrode PE may contact the contact electrode CNT through the depression pattern 152, thereby electrically connecting the pixel electrode PE to the TFT SW. An area of the pixel electrode PE on the depression pattern 152 may be relatively wider than an area of the pixel electrode PE formed on a planar area of the domain-forming layer 150. Accordingly, when an electric field is formed between the first substrate 100 and the second substrate 200, an electric field intensity of an area adjacent to the depression pattern 152 may be relatively greater than an electric field intensity of the planar area in which the depression pattern 152 is not formed.

In some cases, the first alignment layer AL1 may be formed on the entire surface of the first base substrate 110 including the pixel electrode PE. In some cases, the first alignment layer AL1 may be formed on part of the surface of the first base substrate 110 including the pixel electrode PE.

The second substrate 200 may include a second base substrate 210 facing the first substrate 100, a black matrix pattern 220, a first color filter 232, a second color filter 234, a third color filter 236, an overcoating layer 240, a common electrode layer 250, and a second alignment layer AL2. In some cases, the overcoating layer 240 may be omitted from the second substrate 200.

The black matrix pattern 220 may be formed on the second base substrate 210 in an area that corresponds to the area in which the first and second gate lines GL1 and GL2, the first and second data lines DL1 and DL2, and the TFT SW are formed. The first, second and third color filters 232, 234, and 236 may be formed on the second base substrate 210. The black matrix pattern 220 may be placed between the color filters 232, 234, and 236. For example, the first color filter 232 may be formed on the second base substrate 210 in an area corresponding to the pixel area P on which the pixel electrode PE is formed. The second color filter 234 may be formed in the first direction D1, and the third color filter 236 may be formed in an opposite direction of the first direction D1. The overcoating layer 240 may be formed on the second base substrate 210 on which the black matrix pattern 220 and the first, second and third color filters 232, 234 and 236 are formed. The overcoating layer 240 may planarize the second substrate 200.

The common electrode 250 may be formed on the overcoating layer 240. The common electrode 250 may include an optically transparent and electrically conductive material. The common electrode 250 may be formed on the second substrate 200 without a separate depression pattern being formed thereon. In some cases, the common electrode 250 may cover an entire surface of the second substrate 200.

The second alignment layer AL2 may be formed on the common electrode 250, and may be formed, in some cases, on the entire surface of the second substrate 200.

The liquid crystal layer 300 may be disposed between the first substrate 100 and the second substrate 200. The liquid crystal layer 300 may include the liquid crystal molecules 310 and an RM curing material 320. An electric field may be generated between the pixel electrode PE and the common electrode 250. An arrangement of the liquid crystal molecules 310 may be altered by the electric field via the pixel electrode PE and depression pattern 152, so that a transmissivity may be adjusted. The liquid crystal molecules 310 may have negative dielectric anisotropy.

When a voltage is not applied to the pixel electrode PE and the common electrode 250, a long axis of the liquid crystal molecules 310 adjacent to the first substrate 100 and/or the second substrate 200 may be arranged substantially perpendicular to a surface of the first base substrate 110 and/or a surface of the second base substrate 210. With respect to a surface of a side wall of the domain-forming layer 150 which forms the depression pattern 152, a long axis of the liquid crystal molecules 310 adjacent to the depression pattern 152 may be arranged perpendicular to a surface of the side wall.

The RM curing material 320 may be disposed along the liquid crystal molecules 310 adjacent to the pixel electrode PE and/or the common electrode 250. For example, the RM curing material 320 may be disposed along the liquid crystal molecules 310 adjacent to the first alignment layer AL1 and/or the second alignment layer AL2.

Even though an electric field may not be applied to the pixel electrode PE and the common electrode 250, the RM curing material 320 may maintain a pretilt state with respect to the surface of the first base substrate 110 and/or the surface of the second base substrate 210. A plurality of RM monomers 330 (refer to FIG. 3E) may be polymerized by external light during a manufacturing process of the display device, so that the RM curing material 320 may be formed.

Figure 2C:
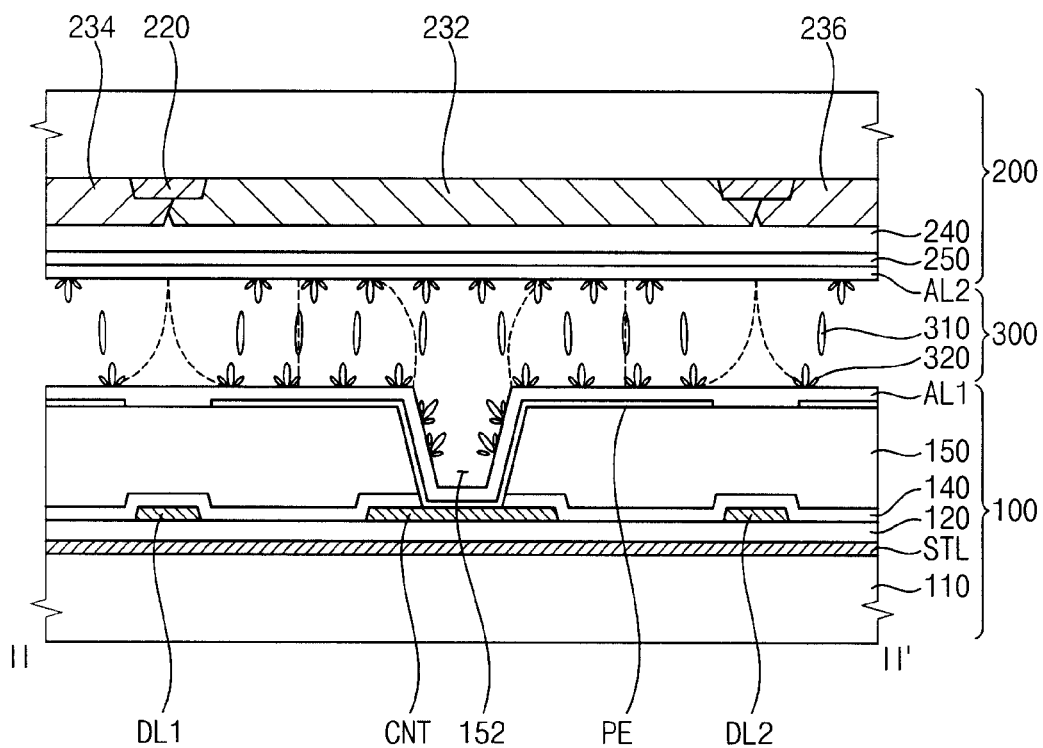
FIG. 2C is a cross-sectional view showing a state in which a voltage is applied to the display device of FIG. 2B.

FIG. 2C is a cross-sectional view showing a state in which a voltage is applied to the display device of FIG. 2B.

Referring to FIG. 2C, when an electric field is formed between the pixel electrode PE and the common electrode 250, a direction of the electric field inside the pixel area P may be perpendicular to a surface of the first substrate 100 and/or the second substrate 200.

In some cases, the direction of the electric field may be curved between an end portion of the pixel electrode PE and the common electrode 250. The direction of the electric field may also be curved between an end portion of another pixel electrode adjacent to the pixel electrode PE and the common electrode 250. Accordingly, in an area adjacent to the pixel electrodes PE, the liquid crystal molecules 310 may be arranged to diffuse towards the adjacent portion of the common electrode 250, so that a liquid crystal domain between the adjacent pixel areas P may be divided.

An electric field in an area adjacent to the depression pattern 152 may have a shape which convergences toward a first position of the common electrode 250, for example, an area of the common electrode 250 corresponding to the depression pattern 152, due to a pretilt by side walls of the depression pattern 152.

FIG. 3A, FIG. 3B, FIG. 3C, FIG. 3D, and FIG. 3E are cross-sectional views taken along a line II-II' of FIG. 1 illustrating a process for manufacturing the display device of FIG. 2B according to exemplary embodiments of the present invention. FIG. 3A, FIG. 3B, FIG. 3C, FIG. 3D, and FIG. 3E may be explained in detail with reference to FIG. 1, FIG. 2B, and FIG. 2C.

Figure 3A:
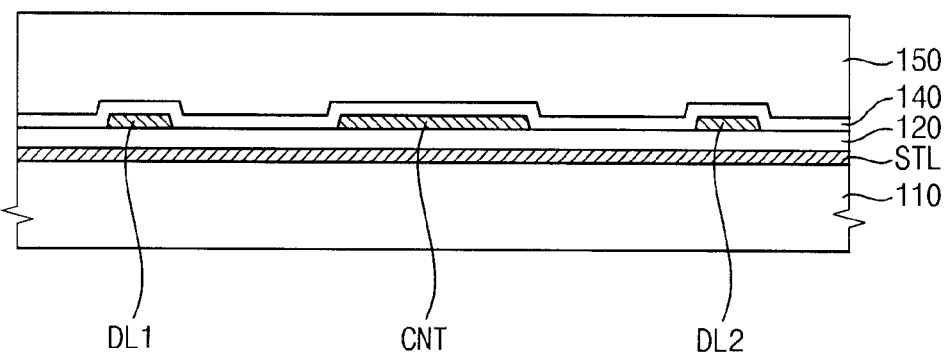
FIG. 3A, FIG. 3B, FIG. 3C, FIG. 3D, and FIG. 3E are cross-sectional views showing a method of manufacturing the display device of FIG. 2B according to exemplary embodiments of the present invention.

Referring to FIG. 3A, a gate metal layer (not shown) may be formed on the first base substrate 110. The gate metal layer may be patterned through a photolithography process to form a gate pattern including the first and second gate lines GL1 and GL2, the gate electrode GE and the storage line STL.

The gate insulation layer 120 may be disposed on the first base substrate 110 having the gate pattern formed thereon. The gate insulation layer 120 may include silicon oxide (SiOx) and/or silicon nitride (SiNx). In general, any suitable material may be used to form the gate insulation layer 120.

The active pattern AP may include the semiconductor layer 130a and the ohmic contact layer 130b. The semiconductor layer 130a and the ohmic contact layer 130b may sequentially be formed on the gate insulation layer 120. The semiconductor layer 130a may include amorphous silicon (a-Si), and the ohmic contact layer 130b may include N+ amorphous silicon doped with a high concentration of n-type dopants. In should be understood that various suitable materials may be used alone or in combination to form the semiconductor layer 130a and/or the ohmic contact layer 130b.

A data metal layer (not shown) may be formed on the active pattern AP. The data metal layer may be patterned through a photolithography process to form a source pattern including the first and second data lines DL1 and DL2, the source electrode SE, the drain electrode DE, and the contact electrode CNT.

The passivation layer 140 and the domain-forming layer 150 may sequentially be formed on the source pattern. A material forming the passivation layer 140 may be, for example, silicon oxide (SiOx) and/or silicon nitride (SiNx). A material forming the domain-forming layer 150 may be, for example, an organic material such as a positive photoresist composition, a negative photoresist composition, and/or an inorganic material such as silicon oxide (SiOx), silicon nitride (SiNx). In should be understood that various suitable materials may be used alone or in combination to form the passivation layer 140 and the domain forming layer 150.

Figure 3B:
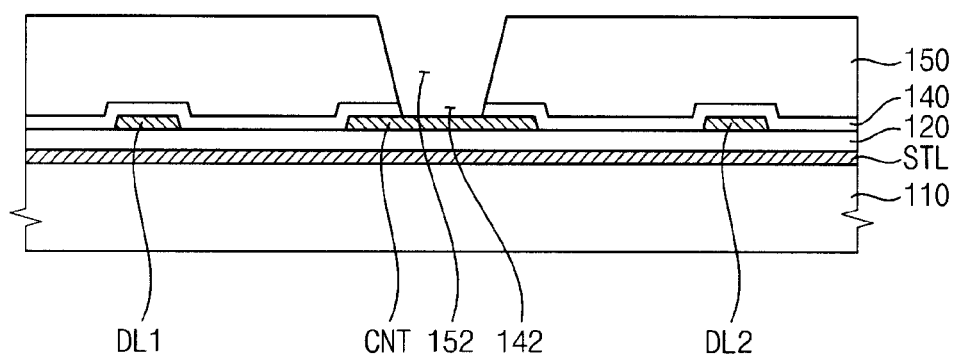

Referring to FIG. 3B, the domain-forming layer 150 may be patterned to form the depression pattern 152. The depression pattern 152 may be formed on the contact electrode CNT. The contact electrode CNT may overlap the storage line STL. The depression pattern 152 may be formed in a hole-shape exposing the passivation film 140 on the contact electrode CNT.

Then, the passivation film 140 exposed through the depression pattern 152 may be removed to form a passivation hole 142. The passivation hole 142 may be formed on the contact electrode CNT. A portion of the contact electrode CNT may be exposed through the contact hole 142 and the depression pattern 152.

Figure 3C:
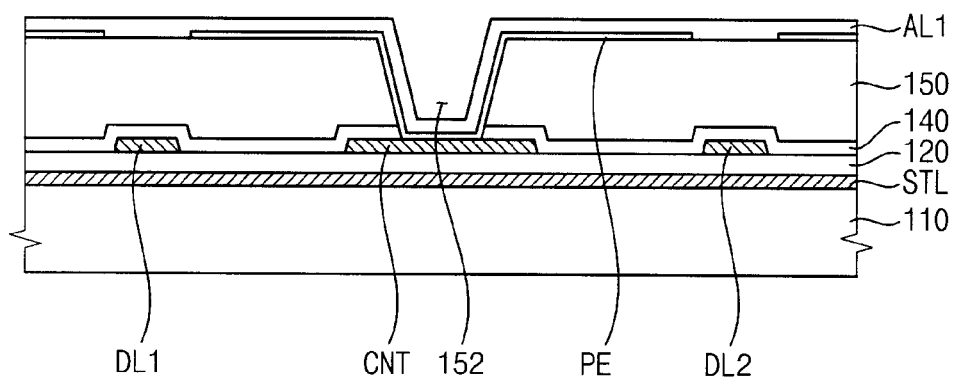

Referring to FIG. 3C, a transmissive electrode layer (not shown) may be formed on the domain-forming layer 150 and in the depression pattern 152. The transmissive electrode may be patterned to form the pixel electrode PE. The transmissive electrode layer may include indium tin oxide (ITO) and/or indium zinc oxide (IZO).

The first alignment layer AL1 may be disposed on the pixel electrode PE. The first alignment layer AL1 may include a vertical alignment material which may vertically align the liquid crystal molecules 310.

Accordingly, the first substrate 100 including the gate insulation layer 120, the active pattern AP, the source pattern, the passivation layer 140, the depression pattern 152, the pixel electrode PE, and the first alignment layer AL1 may be manufactured.

Figure 3D:
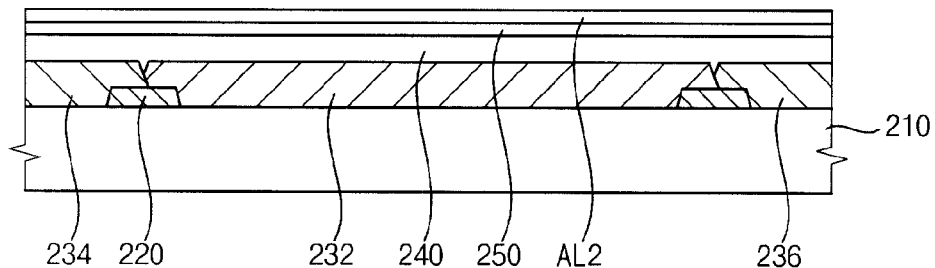

FIG. 3D is a cross-sectional view showing a method of manufacturing the second substrate of FIG. 2B.

Referring to FIG. 3D, the black matrix pattern 220 may be formed on the second base substrate 210. The black matrix pattern 220 may be formed by spraying an organic ink or patterning a metal layer through a photoetching process.

The first, second and third color filters 232, 234 and 236 may be formed on the second base substrate 210 and the black matrix pattern 220. For example, the first color filter 232 may be formed on the second base substrate 210, the second color filer 234 may be formed on the first color filer 232, and the third color filter 234 may be formed on the first and second color filters 232 and 234. The first, second and third color filters 232, 234 and 236 may be formed by patterning a color photoresist layer through a photoetching process or by spraying a color ink.

The overcoating layer 240 may be disposed on the black matrix pattern 220 and the first to third color filters 232, 234 and 236. An acrylate resin may be used to form the overcoating layer 240.

A transmissive electrode layer (not shown) may be disposed on the overcoating layer 240 to form the common electrode 250. In some cases, the common electrode 250 may cover the entire surface of the second base substrate 210 without patterning the transmissive electrode layer. The common electrode 250 may include indium tin oxide (ITO) and/or indium zinc oxide (IZO).

The second alignment layer AL2 may be disposed on the common electrode 250. In some cases, the second alignment layer AL2 may cover the entire surface of the common electrode 250.

Therefore, the second substrate 200 including the black matrix pattern 220, the first to third color filters 232, 234 and 236, the overcoating layer 240, the common electrode 250, and the second alignment layer AL2 may be manufactured.

Figure 3E:
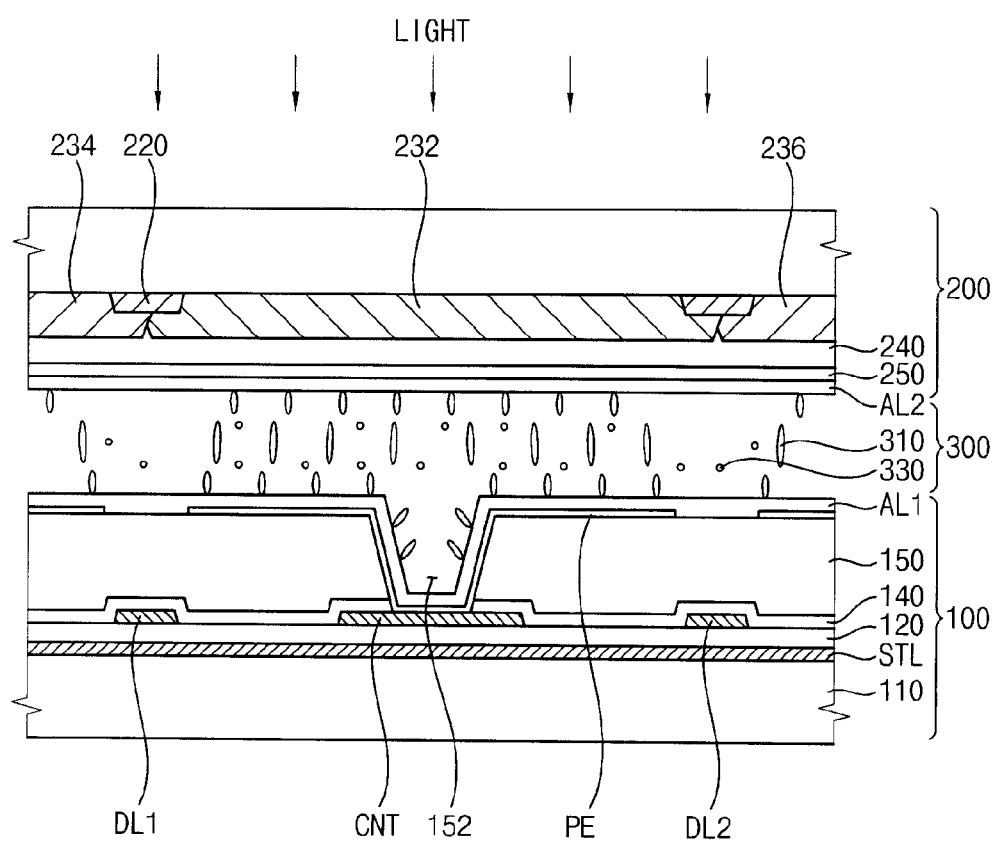

FIG. 3E is a cross-sectional view showing a step of forming the liquid crystal layer in FIG. 2B.

Referring to FIG. 3E, the first substrate 100 and the second substrate 200 may be assembled with each other. The liquid crystal molecules 310 and the RM monomer 330 may be disposed between the first substrate 100 and the second substrate 200. In some cases, the liquid crystal molecules 310 and the RM monomer 330 may randomly be disposed between the first substrate 100 and the second substrate 200.

A first voltage Vcom may then be applied to the common electrode 250, and a second voltage Vdata that is different from the first voltage Vcom may be applied to the pixel electrode PE. The applied voltages (e.g., Vdata, Vcom) may be a positive voltage, a negative voltage, and/or a zero voltage (e.g., ground potential). By applying different voltages to the common electrode 250 and the pixel electrode PE, an electric field may be formed between the pixel electrode PE and the common electrode 250. When the electric field is formed therebetween, a long axis of the liquid crystal molecules 310 may be perpendicular to the electric field direction.

In some cases, the first voltage Vcom may have a higher level than the second voltage Vdata. For example, the first voltage Vcom may be about 0 V, and the second voltage Vdata may be a negative value. The second voltage Vdata may be about −5 V.

When an electric field is formed between the first substrate 100 and the second substrate 200 thereby pretilting liquid crystal molecules 310, light is irradiated into the first and second substrates 100 and 200. The light may be, for example, ultraviolet (UV) light. The RM monomers 330 may react to the light and may be polymerized thus forming the RM curing material 320 between the liquid crystal molecules 310. Accordingly, the liquid crystal layer 300 according to Example 1 may be formed.

A liquid crystal domain may be formed by the depression pattern 152 in the domain-forming layer 150 without separately forming a pattern on the common electrode 250. Thus, an aperture ratio of the pixel area P and a viewing angle of the LCD may be enhanced. Moreover, since a separate pattern is not formed on the common electrode 250, problems due to misalignment of the first and second substrates 100 and 200 may, in principle, no longer exist. Furthermore, a separate patterning process for patterning the common electrode 250 is omitted, so that a manufacturing process may be simplified. Therefore, production and display quality of a display device may be enhanced.

EXAMPLE 2

Figure 4:
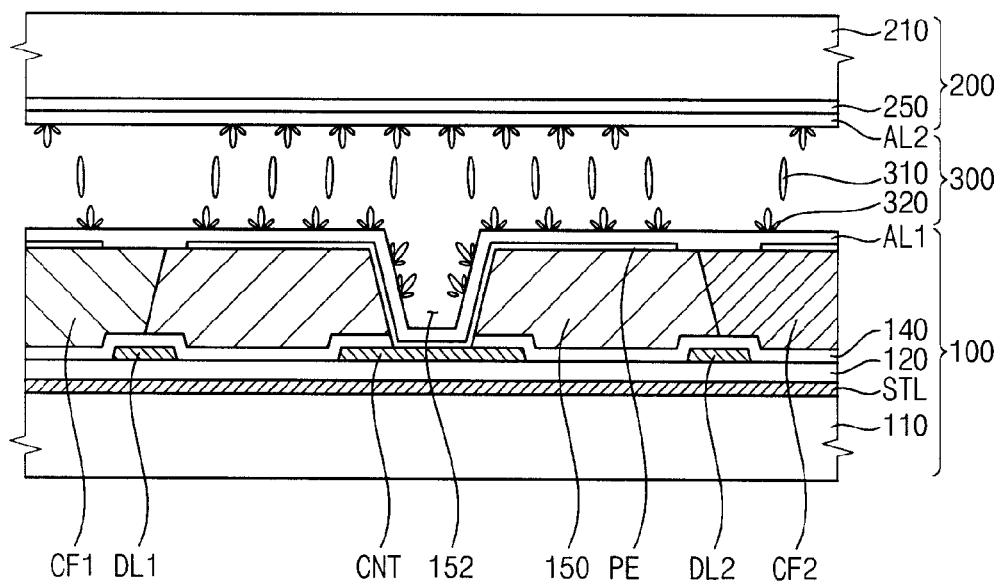
FIG. 4 is a cross-sectional view of a display device according to exemplary embodiments of the present invention.

FIG. 4 is a cross-sectional view of a display device according to some exemplary embodiments of the present invention.

A structure of the display device according to the illustrated embodiment shown in FIG. 4 is substantially the same as the structure of the display device shown in FIG. 1. Thus, a plan view of FIG. 4 may be explained with reference to FIG. 1, and any repetitive detailed explanation may be hereinafter omitted.

Referring to FIG. 1 and FIG. 4, a display device may include a first substrate 100, a second substrate 200, and a liquid crystal layer 300.

The first substrate 100 may include a first base substrate 110, a storage line STL, a gate insulation layer 120, a first data line DL1, a second data line DL2, a passivation film 140, a domain-forming layer 150, a pixel electrode PE, and a first alignment layer AL1. The storage line STL may be formed on the first base substrate 110. The gate insulation layer 120 may be disposed over the storage line STL. The first data line DL1 and the second data line DL2 may be formed on the gate insulation layer 120. The passivation film 140 may be patterned and may expose a portion of the contact electrode CNT. The domain-forming layer 150 may be disposed on the passivation film 140 and the depression pattern 152 may be formed to expose a portion of the contact electrode CNT. The pixel electrode PE may be formed on the domain-forming layer 150 and may contact the contact electrode CNT through the depression pattern 152. The first alignment layer AL1 may cover the pixel electrode PE.

The domain-forming layer 150 may be formed on the passivation layer 140 to planarize the first substrate 100. The domain-forming layer 150 may be formed in a pixel area P of the first base substrate 110. The domain-forming layer 150 may include one or more color filters. For example, the domain-forming layer 150 may include a positive-type color photoresist and/or a negative-type color photoresist. For example, a first color filter layer CF1 and a second color filter layer CF2 may be respectively formed on areas adjacent to the pixel area P where the domain-forming layer 150 is formed. The domain-forming layer 150 may be formed using a different material than the materials used to form the first and second color filters CF1 and CF2. The domain-forming layer 150 may provide a first color, the first color filter layer CF1 may provide a second color different from the first color, and the second color filter layer CF2 may provide a third color different from the first and second colors. In some cases, for example, the domain-forming layer 150 and the first and second color filters CF1 and CF2 may provide red, green, and blue colors.

The domain-forming layer 150 may include the depression pattern 152, which may extend to an overlapping area with the storage line STL. The depression pattern 152 may form a liquid crystal domain of a pixel area P. Each of the first and second color filter layers CF1 and CF2 may include the depression pattern 152. The depression pattern 152 may be substantially the same as the depression pattern described hereinabove with reference to FIG. 2A and FIG. 2B, thus any repetitive detailed explanation may be hereinafter omitted.

The domain-forming layer 150 may include a color layer (not shown) including color filters displaying different colors and a pattern layer (not shown) formed on the color layer. The color layer may include a first color filter, a second color filter, and a third color filter. The pattern layer may include the depression pattern 152, which may form a liquid crystal domain in the pixel area P. The pattern layer may include an organic material and/or an inorganic material.

The second substrate 200 may include a common electrode 250 and a second alignment layer AL2, as described hereinabove with reference to FIG. 2A and FIG. 2B.

Figure 5A:
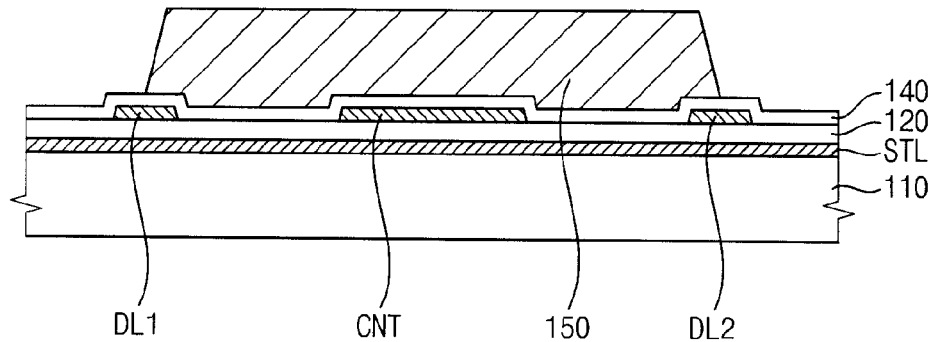
FIG. 5A, FIG. 5B, and FIG. 5C are cross-sectional views showing a method of manufacturing the display device of FIG. 4 according to exemplary embodiments of the present invention.
Figure 5B:
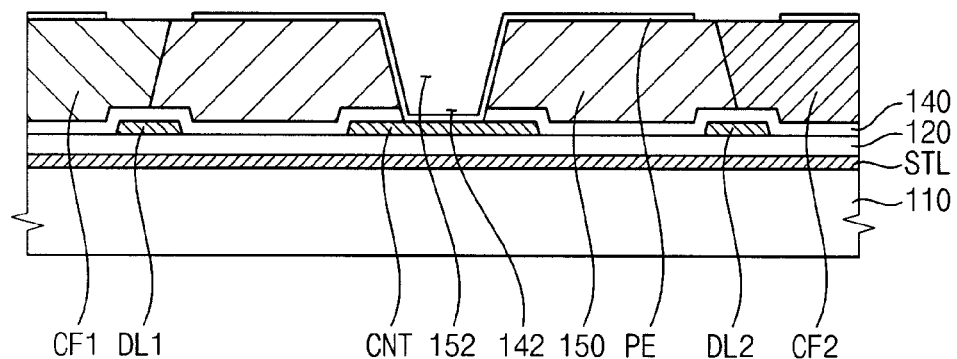
Figure 5C:
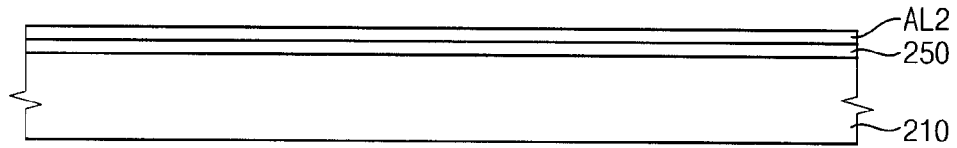

FIG. 5A, FIG. 5B, and FIG. 5C are cross-sectional views showing a method of manufacturing the display device of FIG. 4.

FIG. 5A and FIG. 5B are cross-sectional views illustrating a manufacturing process of the first substrate shown in FIG. 4. In FIG. 5A, the storage line STL, the gate insulation layer 130, the first and second data lines DL1 and DL2 and the passivation film 140 may be formed in substantially the same manner as described with reference to FIG. 3A, and thus any repetitive detailed explanation may hereinafter be omitted.

Referring to FIG. 5A, a first color photoresist layer (not shown) may be formed on the passivation layer 140 from an organic material including a pigment displaying a first color. The first color photoresist layer may be patterned through a photolithography process to form the domain-forming layer 150 formed on the pixel area P. The domain-forming layer 150 may overlap portions of the first and second data lines DL1 and DL2.

Referring to FIG. 4 and FIG. 5B, a second color photoresist layer (not shown) may be formed on the domain-forming layer 150 and the passivation layer 140, and may subsequently be patterned through a photolithography process to form the first color layer CF1. The first color layer CF1 may be formed on a first side of the domain-forming layer 150. That is, the first color layer CF1 may be formed in an area adjacent to the pixel area P. The first color layer CF1 may be a domain-forming layer of the first pixel area adjacent to the pixel area P.

A third color photoresist layer (not shown) may be disposed on the domain-forming layer 150 and the first color layer CF1. The third color photoresist layer may then be patterned through a photolithography process to form the second color layer CF2. The second color layer CF2 may be a domain-forming layer of a second pixel area substantially adjacent to the pixel area P Then, the depression pattern 152 may be formed on the domain-forming layer 150. The depression pattern 152 may be formed on the contact electrode CNT. The depression pattern 152 may expose the passivation layer 140 on the contact electrode CNT. A plurality of depression patterns substantially identical to the depression pattern 152 may be formed in the first and second color layers CF1 and CF2.

A portion of the passivation layer 140 exposed through the depression pattern 152 may be removed to form a passivation hole 142 to expose the contact electrode CNT. A transmissive electrode layer (not shown) may be formed on the passivation hole 142. The transmissive electrode layer may then be patterned through a photolithography process to form the pixel electrode PE. The contact electrode CNT exposed through the depression pattern 152 and the passivation hole 142 may be in contact with the pixel electrode PE. The pixel electrode PE may cover the entire surface of the pixel area P.

The first alignment layer AL1 may then be formed on the pixel electrode PE.

FIG. 5C is a cross-sectional view illustrating a step of manufacturing the second substrate shown in FIG. 4.

Referring to FIG. 5C, a transmissive electrode layer (nor shown) may be formed on the second base substrate 210, so that the common electrode 250 may be formed. In some cases, the common electrode 250 may be formed to cover the entire surface of the second baser substrate 210 without a process of patterning the transmissive electrode layer. The second alignment layer AL2 may be formed on the common electrode 250.

The first substrate 100 and the second substrate may then be assembled with each other, and a liquid crystal layer 300 may be formed between the first substrate 100 and the second substrate 200. A process of forming the liquid crystal layer 300 may be substantially the same as the process of forming the liquid crystal layer as described hereinabove with reference to FIG. 3E, and any repetitive detailed explanation may hereinafter be omitted.

Thus, a display device according to Example 2 may be manufactured.

The depression pattern 152 may be formed without forming a separate pattern in the common electrode 250, so that a liquid crystal domain may be formed. Thus, the aperture ratio of the pixel area P and the viewing angle of the display device may be enhanced. Moreover, since a separate pattern may not be formed on the common electrode 250, misalignment of the first and second substrates 100 and 200 may, in principal, be removed. Furthermore, a separate patterning process for patterning the common electrode 250 may be omitted, so that a manufacturing process of the display device may be simplified. In addition, the domain-forming layer 150 may be formed using a color photoresist layer, so that a manufacturing process of the display device may be simplified.

EXAMPLE 3

Figure 6:
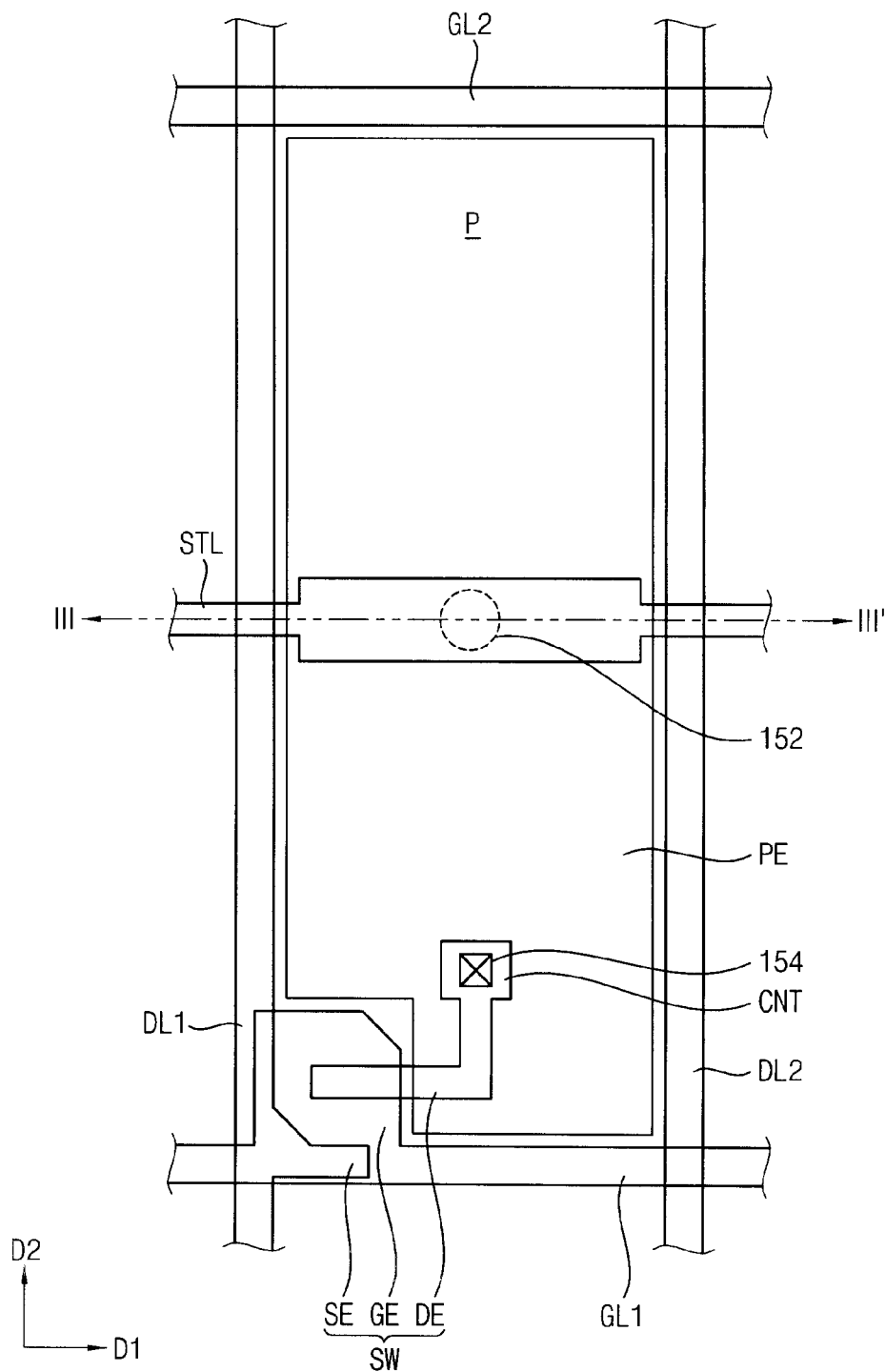
FIG. 6 is a plan view illustrating a display device according to exemplary embodiments of the present invention.

FIG. 6 is a plan view illustrating a display device according to some exemplary embodiments of the present invention.

Figure 7:
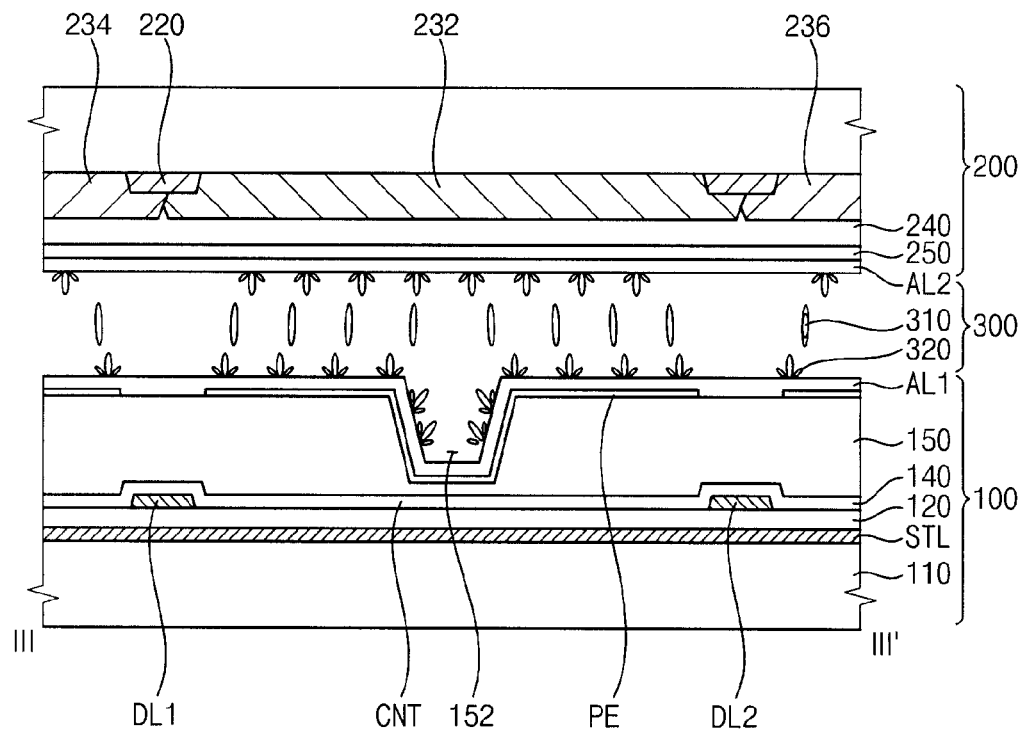
FIG. 7 is a cross-sectional view taken along a line III-III' of FIG. 6.

FIG. 7 is a cross-sectional view taken along a line III-III' of FIG. 6.

Referring to FIG. 6 and FIG. 7, a display device according to some exemplary embodiments may include a first substrate 100, a second substrate 200, and a liquid crystal layer 300.

The first substrate 100 may include a first base substrate 110, first and second gate lines GL1 and GL2, a storage line STL, a gate insulation layer 120, first and second data lines DL1 and DL2, a thin-film transistor (TFT) SW that may be a switching element, a passivation film 140, a domain-forming layer 150, a pixel electrode PE, and a first alignment layer AL1. The first substrate 100 may be substantially the same as the first substrate described with reference to FIG. 1, FIG. 2A, and FIG. 2B except for the TFT SW and the domain-forming layer 150. Any repetitive detailed explanation of the first substrate may hereinafter be omitted.

The TFT SW may include a gate electrode GE connected to the first gate line GL1, an active pattern (not shown) formed on the gate electrode GE, a source electrode SE connected to the first data line DL1, a drain electrode DE spaced apart from the source electrode SE1, and a contact electrode CNT connected to the drain electrode DE to contact the pixel electrode PE. The contact electrode CNT may be extended toward the storage line STL. The contact electrode CNT may be formed on a pixel area P of the first base substrate 110 and may not overlap with the storage line STL.

The domain-forming layer 150 may be formed on the first and second data lines DL1 and DL2, the source electrode SE, and the drain electrode DE. The domain-forming layer 150 may include a depression pattern 152 which may be formed in an area corresponding to the storage line STL or may be formed in correspondence with patterns formed from an opaque metal except the storage line STL. The patterns formed from opaque metal except for the storage line STL may include, for example, the first and second gate lines GL1 and GL2, and/or the first and second data lines DL1 and DL2. The domain-forming layer 150 may be removed, at least partially, by a predetermined thickness, so that the depression pattern 152 may be formed. The depression pattern 152 may be formed in a hole-shape to expose the passivation layer 140. The depression pattern 152 may form a liquid crystal domain of the pixel area P. The storage line STL and/or other patterns formed from an opaque metal formed below the depression pattern 152 may prevent light leakage generated by the depression pattern 152 from being generated.

In FIG. 6 and FIG. 7, the domain-forming layer 150 may include one depression pattern 152. In some cases, at least two depression patterns may be formed on the pixel area P. The number of the depression patterns 152 may determine the number of the liquid crystal domains.

The domain-forming layer 150 may further include a contact hole 154 exposing a portion of the contact electrode CNT. The pixel electrode PE may contact the contact electrode CNT through the contact hole 154, so that the pixel electrode PE may be electrically connected to the TFT SW.

The second substrate 200 and the liquid crystal layer 300 may be substantially the same as the second substrate and the liquid crystal layer described with reference to FIG. 2A and FIG. 2B, and thus any repetitive detailed explanation may hereinafter be omitted.

Hereinafter, a method of manufacturing a display device according to some exemplary embodiments may be described with reference to FIG. 7 and FIG. 8.

Figure 8:
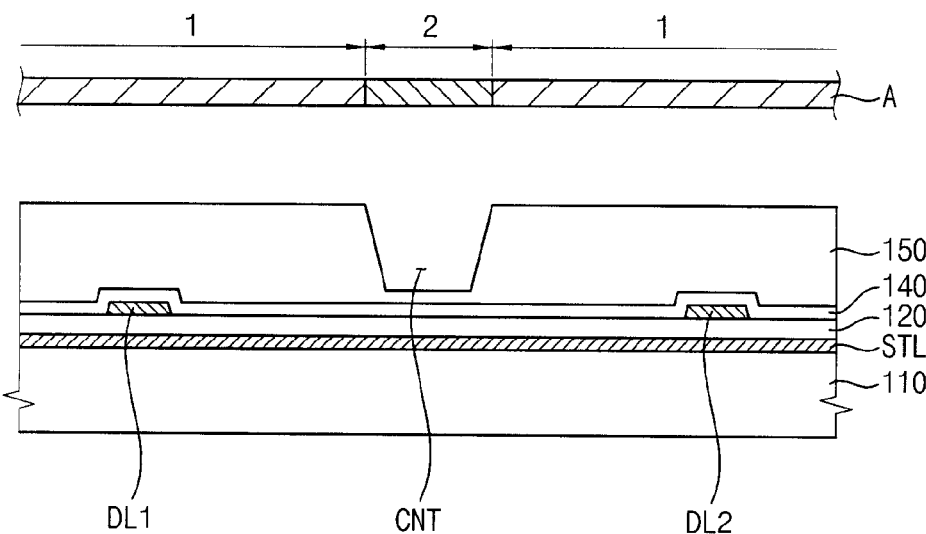
FIG. 8 is a cross-sectional view showing a method of manufacturing the display device of FIG. 7 according to exemplary embodiments of the present invention.

FIG. 8 is a cross-sectional view showing a method of manufacturing the display device of FIG. 7.

In FIG. 8, steps for respectively forming the storage line STL, the gate insulation layer 120, the first and second data lines DL1 and DL2, and the passivation layer 140 may be substantially the same as the steps explained with reference to FIG. 3A. Thus, any repetitive detailed explanation may be hereinafter omitted.

Referring to FIG. 8, the domain-forming layer 150 may be formed on the passivation layer 140, and the domain-forming layer 150 may be patterned using a first mask A to form the depression pattern 152.

The domain-forming layer 150 may be formed from a positive-type photoresist composition. The first mask 'A' may include a light-blocking portion 1 which may block light and a translucent portion 2 which may allow, at least partially, light to pass through. The first mask 'A' may allow approximately 0% to 30% of the light irradiated onto an upper portion of the first mask 'A' to pass through the translucent portion 2.

When light is irradiated onto the upper portion of the first mask 'A' and the domain-forming layer 150 is developed, the domain-forming layer 150 corresponding to (i.e., aligned with) the light-blocking portion '1' may remain on the passivation layer 140 and a portion of the domain-forming layer 150 corresponding to the translucent portion '2' may be removed to form the depression pattern 152.

The pixel electrode PE and the first alignment layer AL1 may sequentially be formed on the domain-forming layer 150 comprising the depression pattern 152. The pixel electrode PE and the first alignment layer AL1 may be formed to cover an entire surface of the pixel area P. Thus, the first substrate 100 according to Example 3 may be manufactured.

Referring again to FIG. 7, the second substrate 200 may be manufactured, and the first substrate 100 and the second substrate 200 may be assembled with each other to produce the liquid crystal layer 300, so that the display device according to some exemplary embodiments of the present invention may be manufactured.

In FIG. 7, a process manufacturing the second substrate 200 and a process manufacturing the liquid crystal layer 300 may substantially be the same as processes described with reference to FIG. 3A and FIG. 3E, respectively. Thus, any repetitive detained explanation may be hereinafter omitted.

As described above, a liquid crystal domain may be formed by forming the depression pattern 152 without forming a separate pattern on the common electrode 250. Thus, the aperture ratio of the pixel area P and a viewing angle may be enhanced. Moreover, since a separate pattern may not be formed on the common electrode 250, misalignment of the first and second substrates 100 and 200 may, in principle, be removed. Furthermore, a separate patterning process for patterning the common electrode 250 may be omitted, so that a manufacturing process of the display device may be simplified.

EXAMPLE 4

Figure 9:
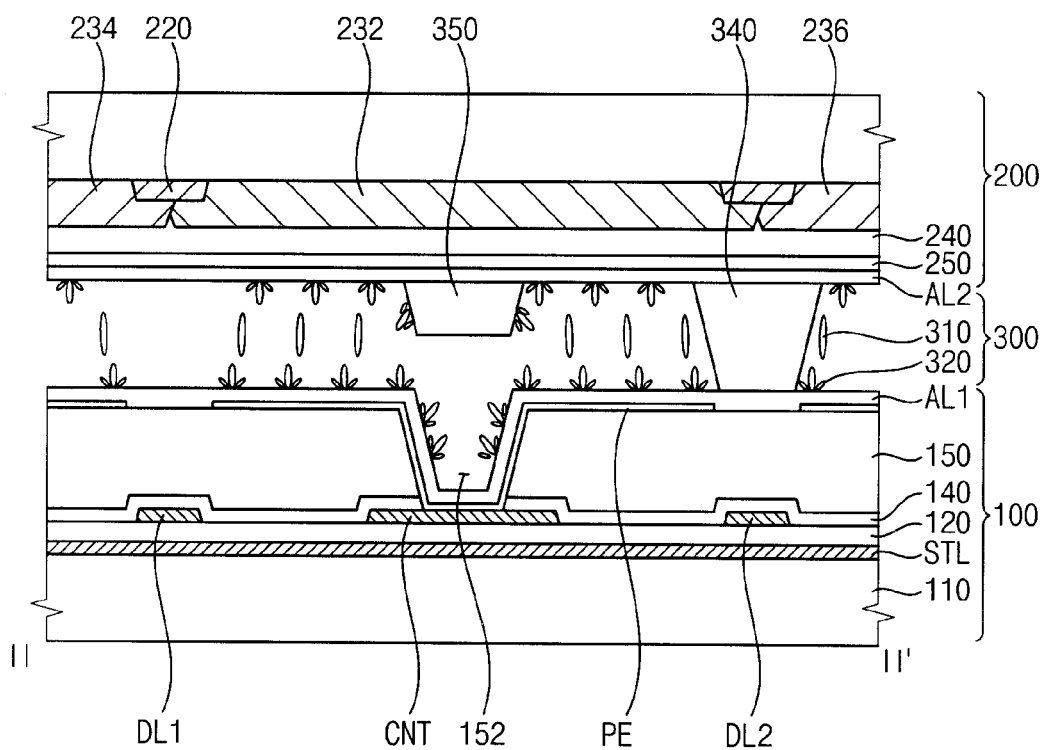
FIG. 9 is a cross-sectional view of a display device according to exemplary embodiments of the present invention.

FIG. 9 is a cross-sectional view of a display device according to some exemplary embodiments of the present invention.

A plan structure of the display device illustrated in FIG. 9 may be substantially the same as a plan structure of the display device described with reference to FIG. 1. Thus a detailed description of the plan view of FIG. 9 may be omitted.

The display device of FIG. 9 is substantially the same as the display device of FIG. 2B except for a main spacer 340 and a sub-spacer 350, and any repetitive detailed explanation may hereinafter be omitted.

Referring to FIG. 9, a display device may include a first substrate 100, a second substrate 200, and a liquid crystal layer 300.

The first substrate 100 may include a storage line STL, a gate insulation layer 120 formed on the storage line STL, first and second data lines DL1 and DL2 formed on the gate insulation layer 120, a contact electrode CNT of a TFT SW, a passivation layer 140 formed on the first and second data lines DL1 and DL2, a domain-forming layer 150 including a depression pattern 152 for forming a liquid crystal domain of a pixel area P, a pixel electrode PE, and a first alignment layer AL1.

The second substrate 200 may include a black matrix pattern 220 formed on a second base substrate 210, first, second and third color filters 232, 234 and 236, an overcoating layer 240, a common electrode 250, a second alignment layer AL2, a main spacer 340, and a sub-spacer 350.

The main spacer 340 may be formed on the second substrate 200 to maintain an interval between the first substrate 100 and the second substrate 200. The height of the main spacer 340 may be substantially equal to a cell gap of the liquid crystal layer 300. The main spacer 340 may be disposed on the first alignment layer AL1.

The sub-spacer 350 may be formed on the second substrate 200. When the display device is suppressed by an external force, the sub-spacer 350 may buffer an interval between the first and second substrates 100 and 200 so that liquid crystal molecules 310 of the liquid crystal layer 300 may not be damaged. The height of the sub-spacer 350 may be less than the height of the main spacer 340.

The main spacer 340 and/or the sub-spacer 350 may be formed on the second base substrate 210 corresponding to an area in which the depression pattern 152 is formed. A long axis of the liquid crystal molecules 310 may be arranged perpendicular to a surface of the main spacer 340 and/or the sub-spacer 350, so that the liquid crystal molecules 310 situated in the depression pattern 152 may be pretilted. That is, the liquid crystal molecules 310 may be pretilted relative to the depression pattern 152 and one of the main spacer 340 and the sub-spacer 350.

Hereinafter, a method of manufacturing a display device according to Example 4 may be described with reference to the following FIGS. 9 and 10.

Referring to FIG. 9, the first substrate 100 may be manufactured. The first substrate 100 may be manufactured through processes that are substantially the same as the processes described with reference to FIG. 3A, FIG. 3B, and FIG. 3C.

The second substrate 200 may then be manufactured in substantially the same manner as the second substrate described with reference to FIG. 3D except for manufacturing of the main spacer 340 and the sub-spacer 350. Thus any repetitive detailed explanation may hereinafter be omitted.

Figure 10:
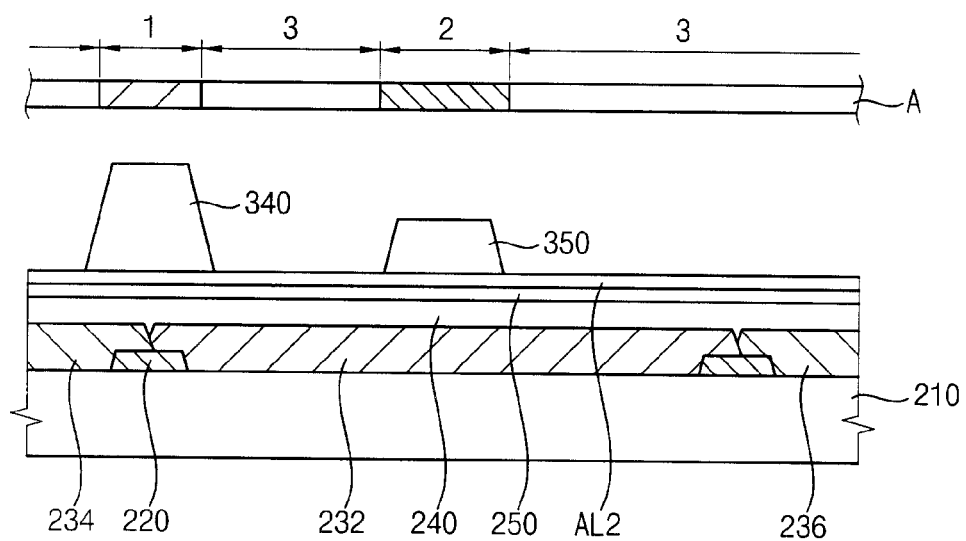
FIG. 10 is a cross-sectional view showing a method of manufacturing the display device of FIG. 9 according to exemplary embodiments of the present invention.

FIG. 10 is a cross-sectional view showing a method of manufacturing the display device of FIG. 9.

Referring to FIG. 10, a photo layer (not shown) may be formed on the second alignment layer AL2. The second photo layer may be developed using a second mask B disposed on the photo layer to form the main spacer 340 and the sub-spacer 350.

The photo layer may include a positive photoresist composition. The second mask B may include a light-blocking portion 1, a translucent portion 2, and a light-permeating portion 3. The light-permeating portion 3 may be an area through which most of the light irradiated on an upper portion of the second mask B may passes.

Light may be irradiated on an upper portion of the second mask B and then the photo layer may be developed. A portion of the photo layer corresponding to the light-blocking portion 1 may remain to form the main spacer 340. A portion of the photo layer corresponding to the translucent portion 2 may be removed, and a remainder of the photo layer may remain to form the sub-spacer 350. A portion of the photo layer corresponding to the transparent portion 3 may be removed thereby exposing the second alignment layer AL2. Thus, the second substrate 200 according to some exemplary embodiments may be manufactured.

The liquid crystal layer 300 may be formed between the first substrate 100 and the second substrate 200. Steps to form liquid crystal layer 300 may be substantially the same as the steps described with reference to FIG. 3E. Thus any repetitive detailed explanation may hereinafter be omitted.

Accordingly, the display device according to Example 4, which may include the first substrate 100, the second substrate 200, and the liquid crystal layer 300, may be manufactured.

In FIG. 9 and FIG. 10, the sub-spacer 350 may be formed relative to the depression pattern 152. In some cases, the main spacer 350 may be formed relative to the depression pattern 152, so that the liquid crystal molecules 310 may be pretilted.

Accordingly, in the display device described with reference to FIG. 9 and FIG. 10, the aperture ratio of the pixel area P may be increased, and a viewing angle may be enhanced. Moreover, the reliability of a manufacturing process may be enhanced and a manufacturing process may be simplified.

EXAMPLE 5

Figure 11:
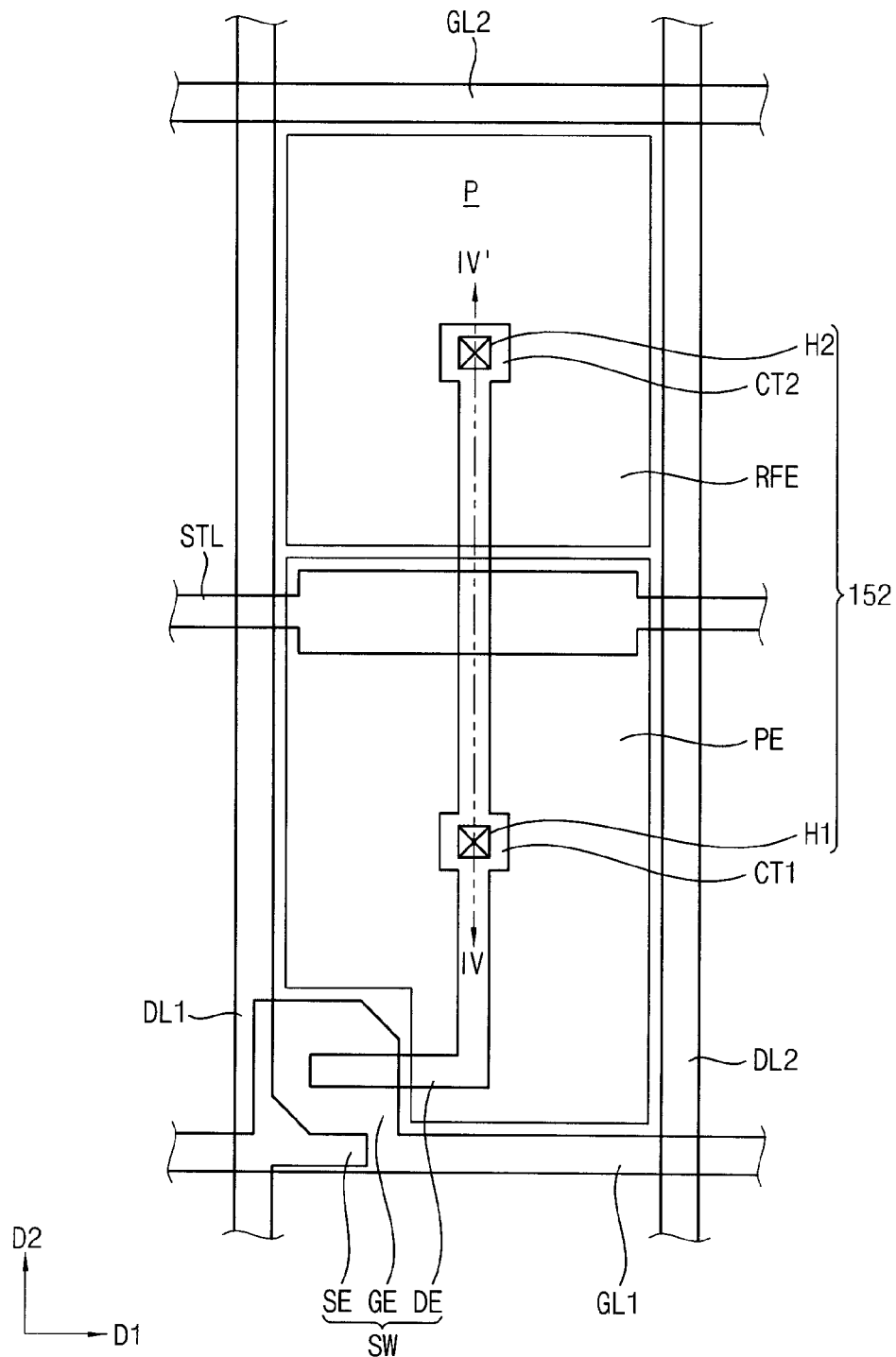
FIG. 11 is a plan view illustrating a display device according to exemplary embodiments of the present invention.

FIG. 11 is a plan view illustrating a display device according to Example 5 of the present invention.

Figure 12:
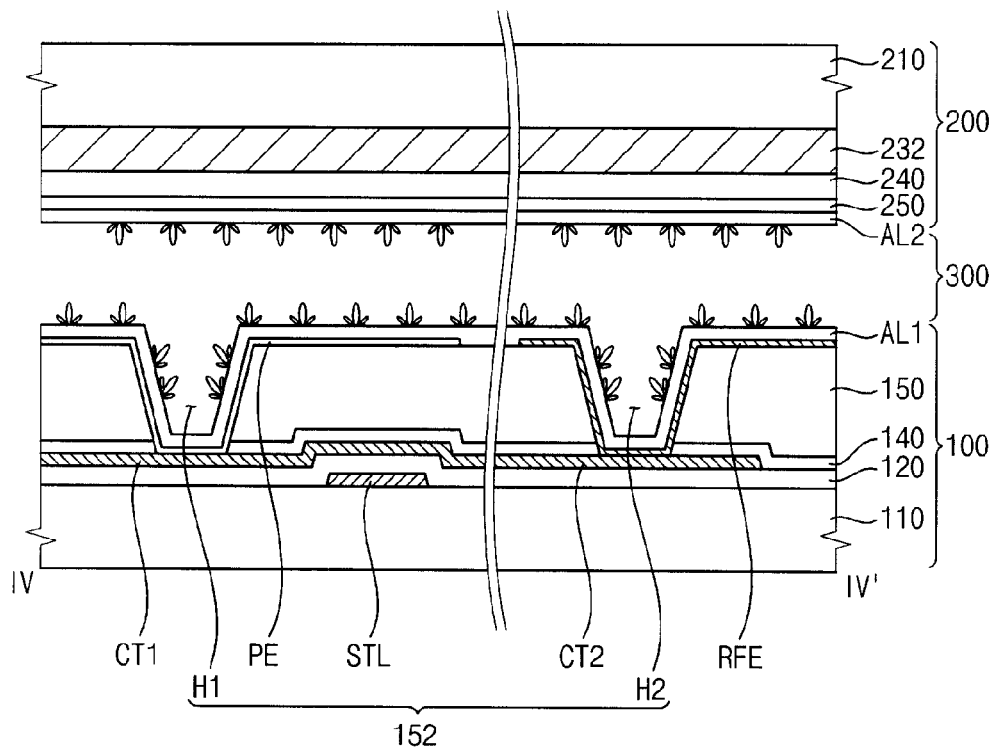
FIG. 12 is a cross-sectional view taken along a line IV-IV' of FIG. 11.

FIG. 12 is a cross-sectional view taken along a line IV-IV' of FIG. 11.

Referring to FIG. 11 and FIG. 12, a display device may include a first substrate 100, a second substrate 200, and a liquid crystal layer 300.

The first substrate 100 may include a first base substrate 110, first and second gate lines GL1 and GL2, a storage line STL, a gate insulation layer 120, first and second data lines DL1 and DL2, a TFT SW that may be a switching element, a passivation film 140, a domain-forming layer 150, a pixel electrode PE, a reflective electrode RFE, and a first alignment layer AL1. The first substrate 100 may be substantially the same as the first substrate described with reference to FIG. 1, FIG. 2A, and FIG. 2B except for the TFT SW, the domain-forming layer 150, and the reflective electrode RFE. Any repetitive detailed explanation may hereinafter be omitted.

The TFT SW may include a gate electrode GE connected to the first gate line GL1, an active pattern (not shown) formed on the gate electrode GE, a source electrode SE connected to the first data line DL1, a drain electrode DE spaced apart from the source electrode SE, a first contact pattern CT1 connected to the drain electrode DE to contact the pixel electrode PE, and a second contact pattern CT2 connected to the first contact pattern CT1 extended in a pixel area P. The second contact pattern CT2 may also contact the reflective electrode RFE.

The domain-forming layer 150 may cover the first and second data lines DL1 and DL2. The domain-forming layer 150 may include a depression pattern 152 forming a liquid crystal domain of the pixel area P. The depression pattern 152 may include a first hole pattern H1 exposing a portion of the first contact pattern CT1 and a second hole pattern H2 exposing a portion of the second contact pattern CT2. A first liquid crystal domain may be formed by the first hole pattern H1, and a second liquid crystal domain may be formed by the second hole pattern H2. That is, one pixel area P may be divided into two liquid crystal domains.

The pixel electrode PE may be formed on the domain-forming layer 150, and, in some cases, may be formed in one area of the pixel area P. The pixel electrode PE may be formed using ITO and/or IZO. The reflective electrode RFE may be formed on the domain-forming layer 150 in another area of the pixel area P. The reflective electrode RFE may be formed, at least partially, of aluminum (Al). The first alignment layer AL1 may be disposed on the pixel electrode PE and the reflective electrode RFE.

The second substrate 200 and the liquid crystal layer 300 are substantially the same as the second substrate and the liquid crystal layer described with reference to FIG. 1, FIG. 2A, and FIG. 2B, and thus any repetitive detailed explanation may hereinafter be omitted.

As illustrated in FIG. 11 and FIG. 12, in some cases, the storage line STL may be situated between the first contact pattern CT1 and the second contact pattern CT2. In some cases, the storage line STL may overlap with the first contact pattern CT1 and/or the second contact pattern CT2.

In some cases, the depression pattern 152 may have two hole patterns H1 and H2. In some cases, the depression pattern 152 may have a plurality of hole patterns to form a plurality of liquid crystal domains.

In some cases, the second hole pattern H2 may be not formed in the depression pattern 152.

In some cases, the pixel electrode PE and the reflective electrode RFE may be electrically connected to each other by a bridge. In some cases, to enhance side visibility (e.g., wide angle viewing), the pixel electrode PE and the reflective electrode RFE may be driven by using a first transistor connected to the pixel electrode PE and a second transistor connected to the reflective electrode RFE, or may be driven using a common swing method in which a common voltage applied to a common electrode may vary with respect to a data voltage.

Figure 13A:
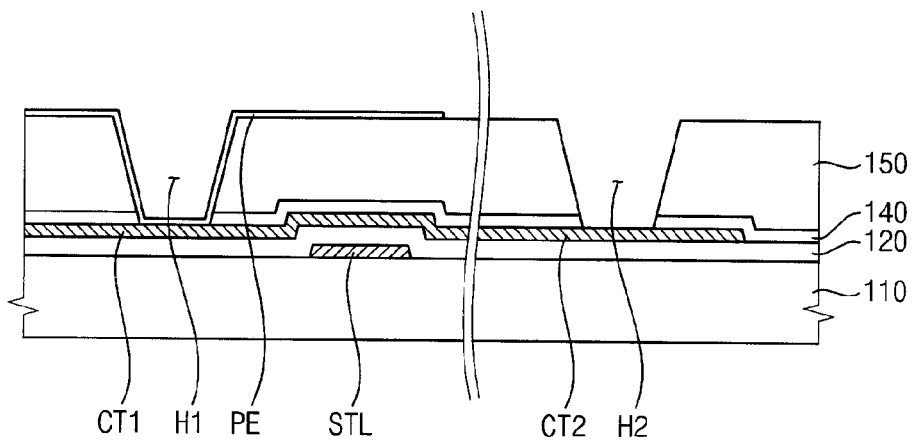
FIG. 13A and FIG. 13B are cross-sectional views showing a method of manufacturing the display device of FIG. 12 according to exemplary embodiments of the present invention.
Figure 13B:
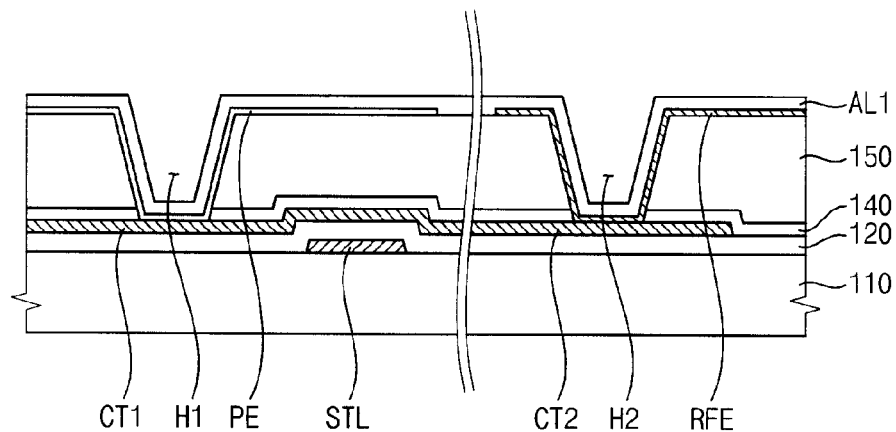

FIG. 13A and FIG. 13B are cross-sectional views showing a method of manufacturing the display device of FIG. 12.

Referring to FIG. 12 and FIG. 13A, a storage line STL may be formed on the first base substrate 110, and the gate insulation layer 120 may be formed on the storage line STL. The first and second contact patterns CT1 and CT2 may be formed on the gate insulation layer 120. The passivation layer 140 and the domain-forming layer 150 are sequentially formed on the first and second contact patterns CT1 and CT2. The domain-forming layer 150 may be patterned to form the depression pattern 152 having the first and second hole patterns H1 and H2.

Then, the passivation layer 140 exposed through the depression pattern 152 may be removed to expose the first and second contact electrodes CT1 and CT2, respectively, thereby forming a transmissive electrode layer (not shown). The transmissive electrode layer may contact the first contact pattern CT1 through the first hole pattern H1 and the second contact pattern CT2 through the second hole pattern H2. The transmissive electrode layer may then be patterned adjacent to the first hole pattern H1 to form the pixel electrode PE contacting the first contact pattern CT1.

Referring to FIG. 13B, an opaque electrode layer (not shown) may be formed on the first base substrate 110 on which the pixel electrode PE is formed. The opaque electrode layer may be patterned adjacent to the second hole pattern H2 to form the reflective electrode RFE contacting the second contact pattern CT2.

Then, the first alignment layer AL1 may be formed on the pixel electrode PE and the reflective electrode RFE. The pixel electrode PE and the first alignment layer AL1 may be formed without using a separate pattern to cover the entire surface of the pixel area P. Thus, the first substrate 100 according to some exemplary embodiments may be manufactured.

The second substrate 200 facing the first substrate 100 may be manufactured and the liquid crystal layer 300 may be formed between the first substrate 100 and the second substrate 200, so that a display device according to Example 5 may be manufactured. A step forming the second substrate 200 and a step forming the liquid crystal layer 300 may be substantially the same as the steps explained in FIGS. 3D and 3E, respectively, and thus any repetitive detailed explanation may be hereinafter omitted.

Figure 14:
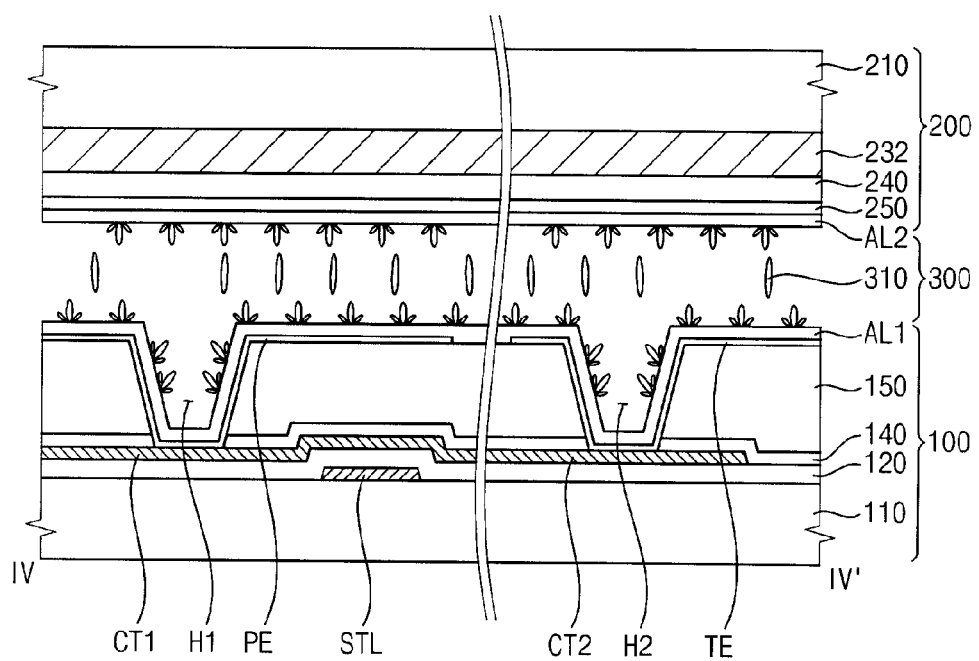
FIG. 14 is a cross-sectional view illustrating a transmissive mode display device of a transmittance mode having a structure of FIG. 11.

FIG. 14 is a cross-sectional view illustrating a transmissive-mode display device having a structure of FIG. 11.

A plan structure of a transmissive-mode display device of FIG. 14 may be substantially the same as a plan structure of FIG. 11. Moreover, the display device of FIG. 14 may be substantially the same as the display device of FIG. 12 except for a transmissive electrode TE, and thus any repetitive detailed explanation may hereinafter be omitted.

Referring to FIG. 14, a pixel electrode PE and a transmissive electrode TE may be formed on a domain-forming layer 150. The transmissive electrode TE may contact a second contact pattern CT2 through a second hole pattern H2. The transmissive electrode TE may include ITO and IZO, and may be identical to material(s) used to form the pixel electrode PE.

In FIG. 14, the pixel electrode PE and the transmissive electrode TE may be physically divided from each other. In some cases, the transmissive electrode TE may be connected to the pixel electrode PE.

According to the description of the display device in Example 5, an aperture ratio of the pixel area P may be increased, and a viewing angle may be enhanced. For example, a plurality of liquid crystal domains may be formed in one pixel area P, so that a viewing angle may be further enhanced. Moreover, the reliability of a manufacturing process may be enhanced and a manufacturing process may be simplified, so that the productivity of the display device may be enhanced.

EXAMPLE 6

Figure 15:
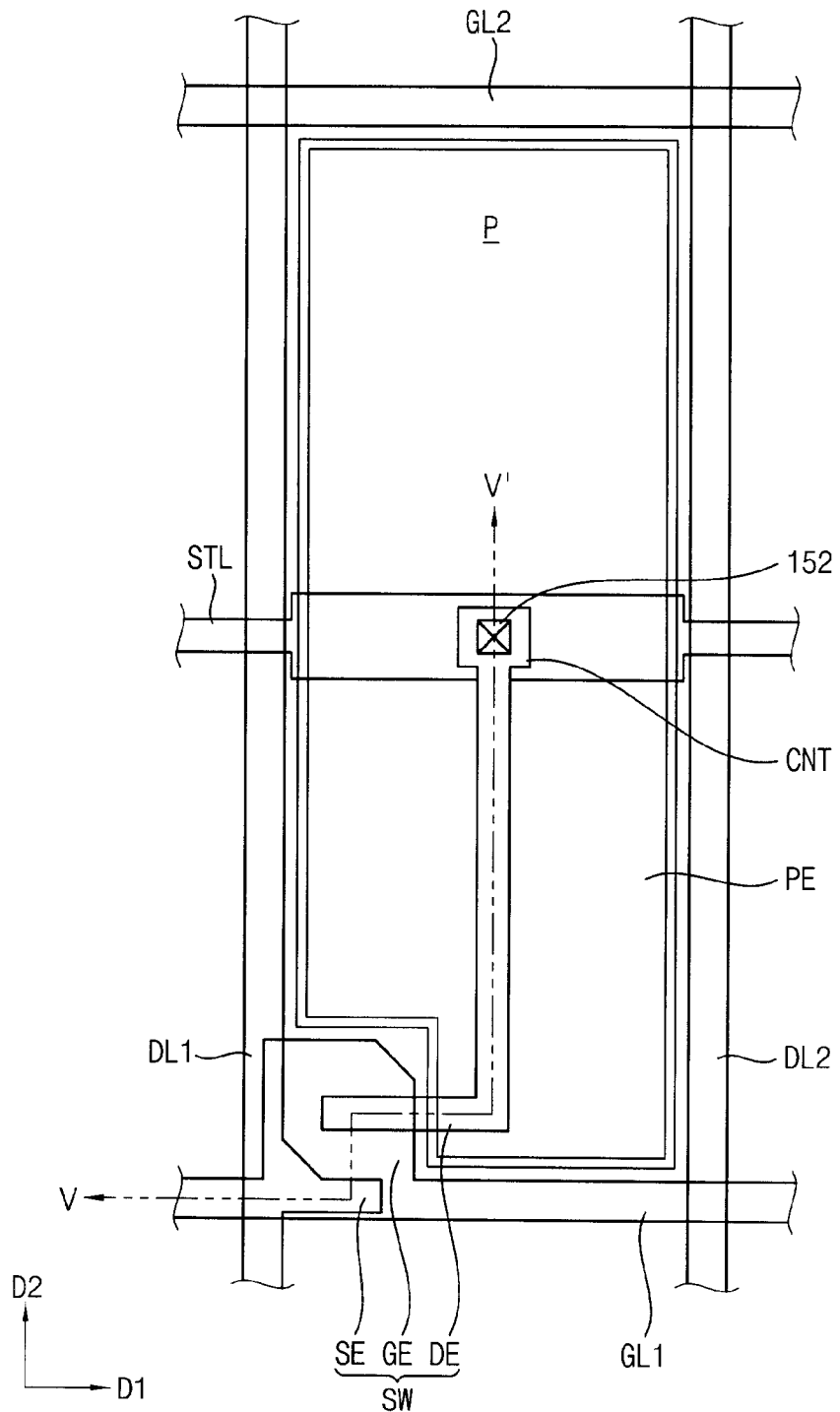
FIG. 15 is a plan view illustrating a display device according to exemplary embodiments of the present invention.

FIG. 15 is a plan view illustrating a display device according to some exemplary embodiments of the present invention.

Figure 16:
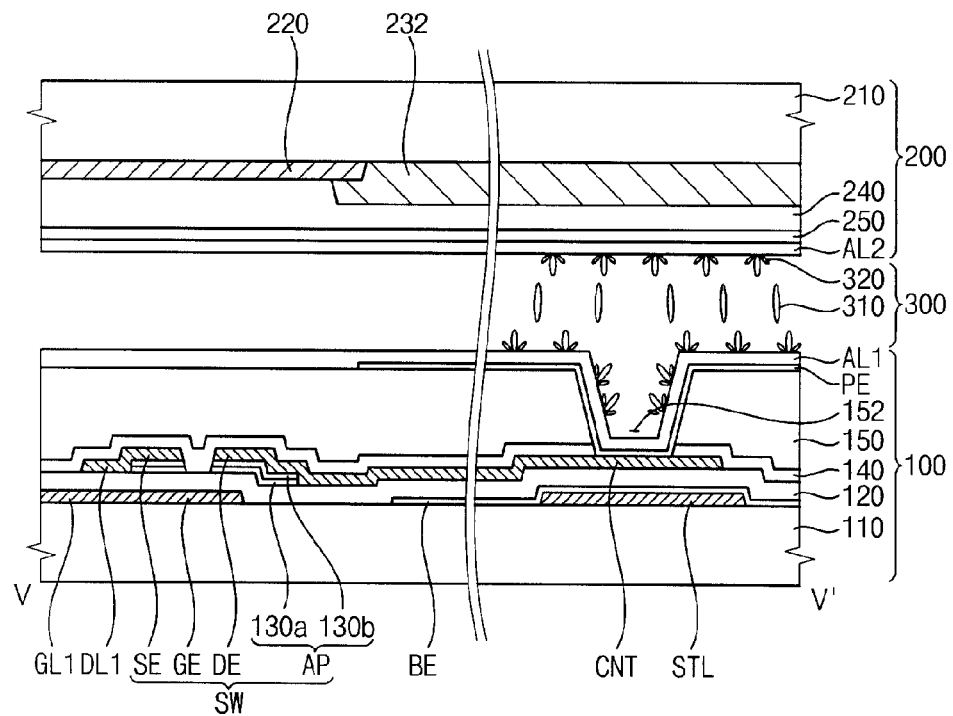
FIG. 16 is a cross-sectional view taken along a line V-V' of FIG. 15.

FIG. 16 is a cross-sectional view taken along a line V-V' of FIG. 15.

Referring to FIG. 15 and FIG. 16, a display device may include a first substrate 100, a second substrate 200, and a liquid crystal layer 300.

The first substrate 100 may include a first base substrate 110, first and second gate lines GL1 and GL2, a storage line STL, a bottom electrode BE, a gate insulation layer 120, first and second data lines DL1 and DL2, a TFT SW that may be a switching element, a domain-forming layer 150, a pixel electrode PE, and a first alignment layer AL1. The first substrate 100 may be substantially the same as the first substrate described in FIG. 1, FIG. 2A, and FIG. 2B except for the bottom electrode BE, and thus any repetitive detailed explanation may hereinafter be omitted.

The bottom electrode BE may be formed in a pixel area P to overlap the pixel electrode PE. The gate insulation layer 120 and the contact electrode CNT of the TFT SW may be formed between the bottom electrode BE and the pixel electrode PE. The bottom electrode BE may be formed on the storage line STL. The bottom electrode BE may directly contact the storage line STL and may be electrically connected to the storage line STL.

The bottom electrode BE and the pixel electrode PE may be charged at different voltages. As a result, an electric field may develop across the gate insulation layer 120. Accordingly, the entire area of the pixel area P may be used as a storage capacitor Cst.

The second substrate 200 and the liquid crystal layer 300 are substantially the same as the second substrate and the liquid crystal layer described in FIG. 1, FIG. 2A, and FIG. 2B, and thus any repetitive detailed explanation may hereinafter be omitted.

Figure 17A:
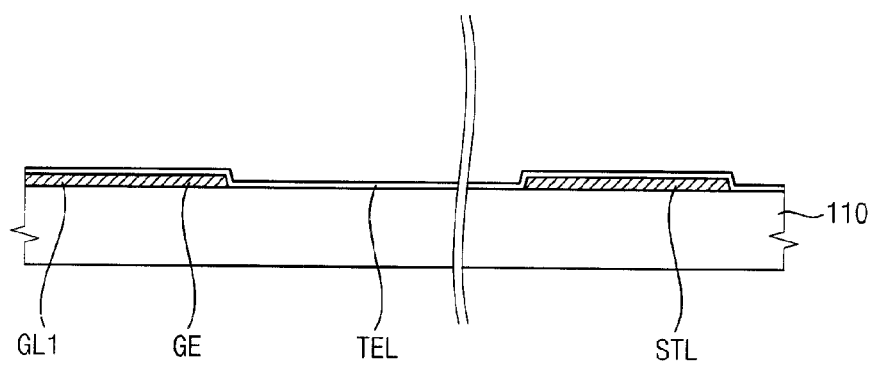
FIG. 17A, FIG. 17B, and FIG. 17C are cross-sectional views showing a method of manufacturing the display device of FIG. 16 according to exemplary embodiments of the present invention.
Figure 17B:
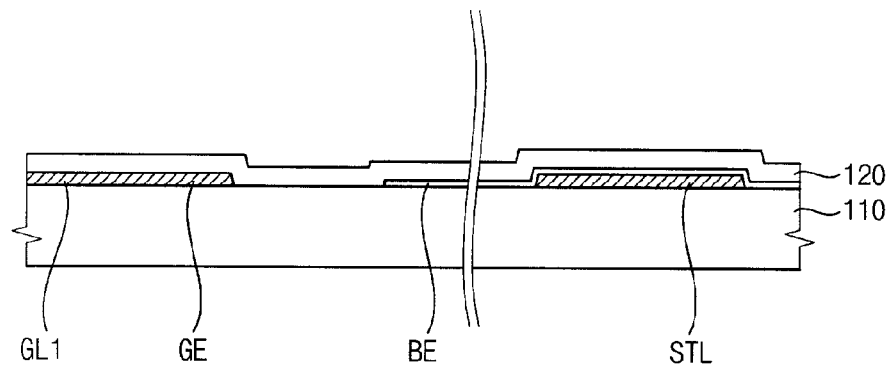
Figure 17C:
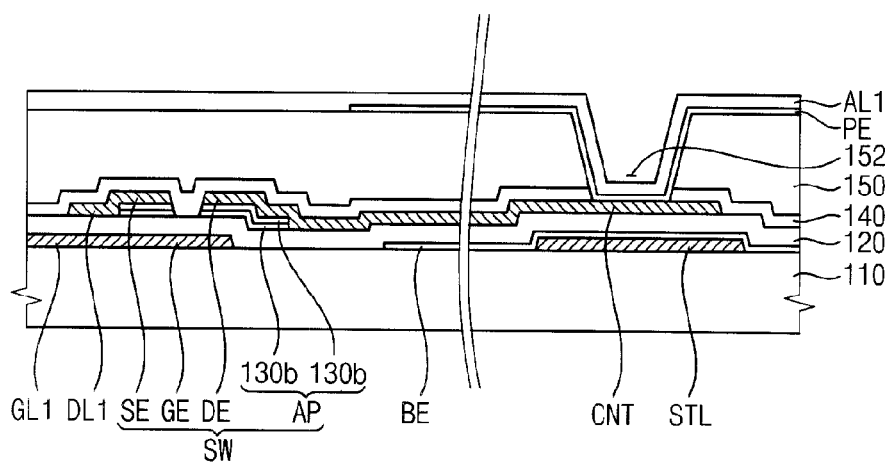

FIG. 17A, FIG. 17B, and FIG. 17C are cross-sectional views showing a method of manufacturing the display device of FIG. 16.

Referring to FIG. 16 and FIG. 17, a gate metal layer (not shown) may be formed on the first base substrate 110, and patterned to form a gate pattern including the first and second gate lines GL1 and GL2, the gate electrode GE, and the storage line STL.

The gate pattern may include a transmissive electrode layer TEL formed on the first base substrate 110. The transmissive electrode TEL may include a transparent conductive material. The transparent conductive material TEL may be indium tin oxide (ITO) and/or indium zinc oxide (IZO). In general, any suitable material(s) and combination thereof may be used for transparent conductive material.

Referring to FIG. 17B, the transmissive electrode layer TEL may be patterned to form the bottom electrode BE. The bottom electrode BE may directly contact the storage line STL.

Then, the gate insulation layer 120 may be formed on the bottom electrode BE.

Referring to FIG. 17C, an active pattern AP of the TFT SW may be formed on the gate insulation layer 120, and a source pattern including the first and second data lines DL1 and DL2, the source electrode SE, the drain electrode DE and the contact electrode CNT may be formed. The passivation film 140 may be formed on the source pattern, and the domain-forming layer 150 may be formed on the passivation film 140.

A depression pattern 152 exposing a portion of the contact electrode CNT may be formed on the domain-forming layer 150. The pixel electrode PE and the first alignment layer AL1 may be sequentially formed on the depression pattern 152. The pixel electrode PE and the first alignment layer AL1 may be formed without a separate pattern covering, in some cases, the entire surface of the pixel area P. Thus, the first substrate 100 according to Example 6 may be manufactured.

The second substrate 200 facing the first substrate 100 may be manufactured and the liquid crystal layer 300 may be formed between the first and second substrates 100 and 200, so that the display device according to some exemplary embodiments may be manufactured. A step for manufacturing the second substrate 200 and a step for manufacturing the liquid crystal layer 300 are substantially the same as the steps described in FIGS. 3D and 3E, respectively, and thus any repetitive detailed explanation may hereinafter be omitted.

According to the description of the display device in Example 6, an aperture ratio of the pixel area P may be increased, and a viewing angle may be enhanced. Moreover, the reliability of a manufacturing process may be enhanced and a manufacturing process may be simplified, so that the productivity of the display device may be enhanced.

EXAMPLE 7

Figure 18:
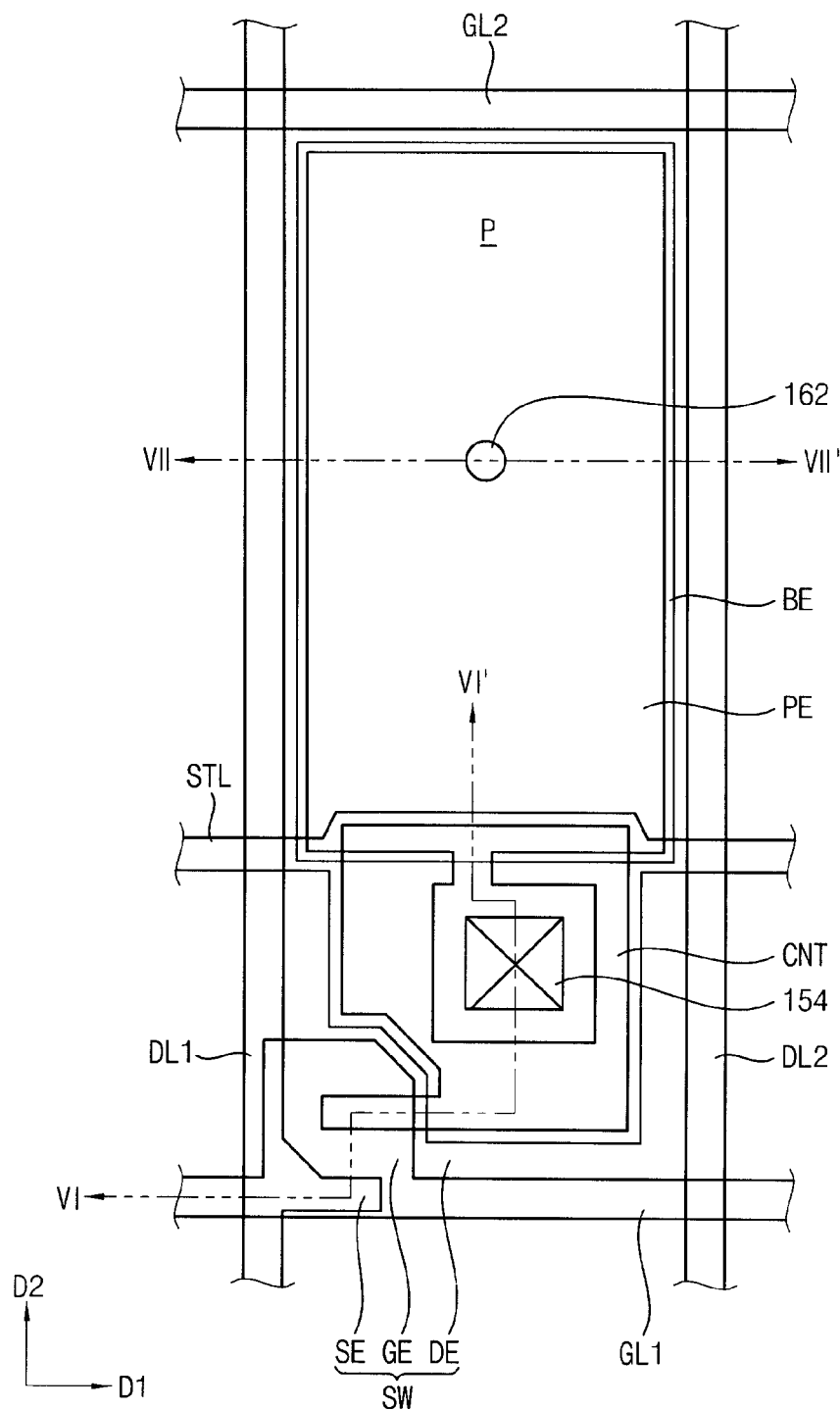
FIG. 18 is a plan view illustrating a display device according to exemplary embodiments of the present invention.

FIG. 18 is a plan view illustrating a display device according to some exemplary embodiments of the present invention.

Figure 19A:
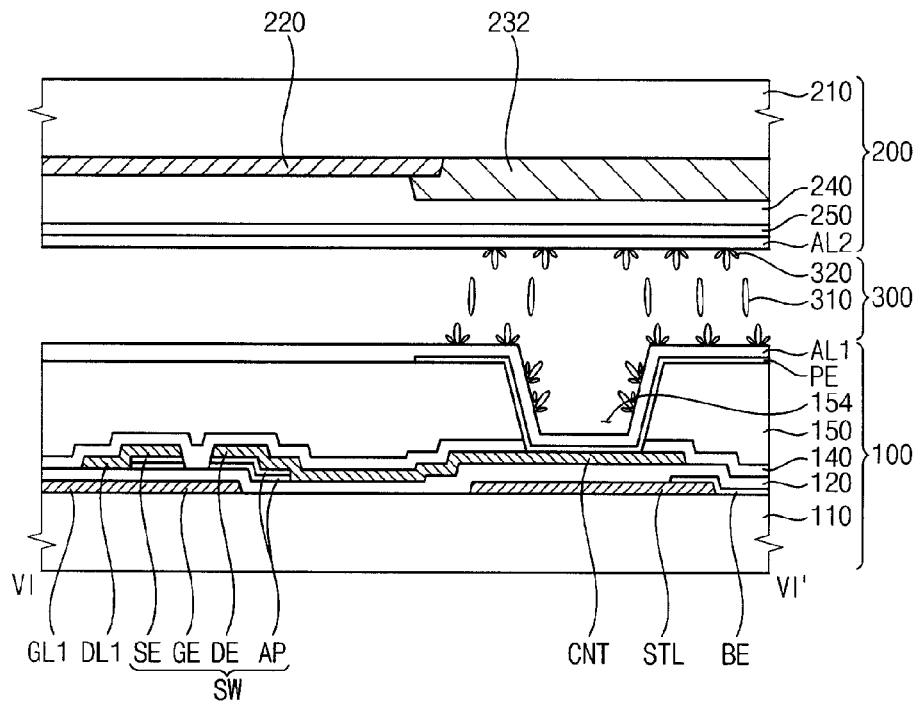
FIG. 19A is a cross-sectional view taken along a line VI-VI' of FIG. 18.
Figure 19B:
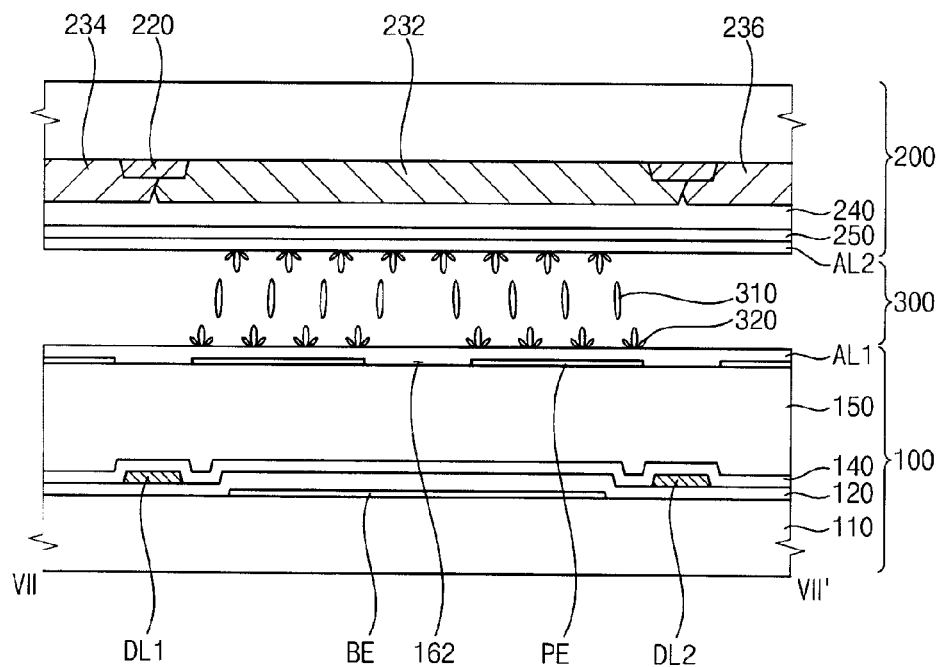
FIG. 19B is a cross-sectional view taken along a line VII-VII' of FIG. 18.

FIG. 19A is a cross-sectional view taken along a line VI-VI' of FIG. 18, and FIG. 19B is a cross-sectional view taken along a line VII-VII' of FIG. 18.

Referring to FIG. 18, FIG. 19A, and FIG. 19B, a display device may include a first substrate 100, a second substrate 200, and a third substrate 300.

The first substrate 100 may include a first base substrate 110, first and second gate lines GL1 and GL2, a storage line STL, a bottom electrode BE, a gate insulation layer 120, first and second data lines DL1 and DL2, a TFT SW that may be a switching element, a passivation film 140, a domain-forming layer 150, a pixel electrode PE, and a first alignment layer AL1.

The first and second gate lines GL1 and GL2 may be extended along a first direction D1 on the first base substrate 110. In some cases, the first and second data lines DL1 and DL2 may be arranged in a second direction D2 that may be different from the first direction D1. The second direction D2 may be substantially perpendicular to the first direction D1.

The storage line STL may be disposed between the first and second gate lines GL1 and GL2 to be extended along the first direction D1. The bottom electrode BE may directly contact a portion of the storage line STL. The bottom electrode BE may be formed in a pixel area P of the first base substrate 110.

The gate insulation layer 120 may be formed on the first base substrate 110 to cover the first and second gate lines GL1 and GL2, the storage line STL, and the bottom electrode BE.

The first and second data lines DL1 and DL2 may extend along the second direction D2 on the gate insulation layer 120. The first and second data lines DL1 and DL2 may cross the first and second gate lines GL1 and GL2 and the storage line STL.

The TFT SW may include a first gate electrode GE1, an active pattern AP, a is source electrode SE, a drain electrode DE, and a contact electrode CNT. The first gate electrode GE1 may be connected to the first gate line GL1. The active pattern AP may be formed on the gate insulation layer 120 adjacent to the first gate electrode GE1. The source electrode SE may be connected to the first data line DL1 to overlap the active pattern AP. The drain electrode DE may be spaced apart from the source electrode SE to overlap the active pattern AP. The contact electrode CNT may extend from the drain electrode DE to the pixel area P. The contact electrode CNT may extend from the drain electrode DE to overlap a portion of the storage line STL. The contact electrode CNT may have a large size and may be formed in an area adjacent to the first gate line GL1.

The domain-forming layer 150 may be formed on the passivation layer 140. The domain-forming layer 150 may planarize the first substrate 100. The domain-forming layer 150 may have a contact hole 154 exposing the contact electrode CNT. The pixel electrode PE formed on the domain-forming layer 150 may contact the contact electrode CNT through the contact hole 154, so that the pixel electrode PE may be electrically connected to the TFT SW.

The pixel electrode PE may be formed on the domain-forming layer 150 of the pixel area P. The pixel electrode PE may include an optically transparent and electrically conductive material. The pixel electrode PE may have a dot-shaped opening pattern 162 formed in the pixel area P. The dot shape may be a circular shape, a polygonal shape, or a line shape. It should be understood that any suitable shape may be used in the opening pattern 162. The liquid crystal molecules 310 of the liquid crystal layer 300 may converge towards a position in the second substrate 200 corresponding to an area in which the opening pattern 162 is formed. The liquid crystal molecules 310 may also be situated around the contact hole 154 and/or the pixel electrode PE. The opening pattern 162 may form a liquid crystal domain of the pixel area P. Moreover, a direction of the electric field in the liquid crystal layer 300 may be curved between an end portion of another pixel electrode adjacent to the pixel electrode PE and the common electrode 250. Accordingly, the liquid crystal molecules 310 adjacent to the pixel electrodes PE may be diffused toward a different position of the common electrode 250, so that a liquid crystal domain between adjacent pixel areas P may be divided.

The first alignment layer AL1 may be formed, in some cases, on the entire surface of the first base substrate 110 including the pixel electrode PE.

The second substrate 200 may include a second base substrate 210, a black matrix pattern 220, first and second color filters 232, 234 and 236, an overcoating layer 240, a common electrode 250, and a second alignment layer AL2. The liquid crystal layer 300 may include liquid crystal molecules 310, and an RM curing structure 320. The second substrate 200 and the liquid crystal layer 300 are substantially the same as the second substrate and the liquid crystal described with reference to FIG. 2A and FIG. 2B, and the any repetitive detailed explanation may hereinafter be omitted.

Hereinafter, a method of manufacturing the first substrate 100 and the second substrate 200 according to some exemplary embodiments may be described with reference to FIG. 19A and FIG. 19B.

Referring to FIG. 19A and FIG. 19B, a gate metal layer (not shown) may be formed on the first base substrate 110, and the gate metal layer may be patterned to form a gate pattern including the first and second gate lines GL1 and GL2, the gate electrode GE, and the storage line STL.

A transmissive electrode layer (not shown) may be formed on the first base substrate 110 and the gate pattern. The transmissive electrode layer may be patterned to form the is bottom electrode, which may directly contact a first end portion of the storage line STL. In the pixel area P, the bottom electrode BE may directly contact the first base substrate 110.

The active pattern AP may be formed on the first base substrate 110 on which the bottom electrode BE is formed. A source metal layer (not shown) may be formed on the first base substrate 110 including the active pattern AP. The source metal layer may be patterned to form a source pattern including the first and second data lines DL1 and DL2, the source electrode SE, the drain electrode DE, and the contact electrode CNT.

The passivation layer 140 and the domain-forming layer 150 may be sequentially formed on the source pattern, and the pixel electrode PE and the first alignment layer AL1 may be sequentially formed on the domain-forming layer 150. Thus, the first substrate according to the some exemplary embodiments may be manufactured.

The second substrate 200 facing the first substrate 100 may be manufactured and the liquid crystal layer 300 may be formed between the first and second substrates 100 and 200, so that the display device according to Example 7 may be manufactured. Steps for manufacturing the second substrate 200 may be substantially the same as the steps described with reference to FIG. 3D, and thus any repetitive detailed explanation may hereinafter be omitted. Hereinafter, a step for forming the liquid crystal layer 300 may be explained in detail with reference to FIG. 20.

Figure 20:
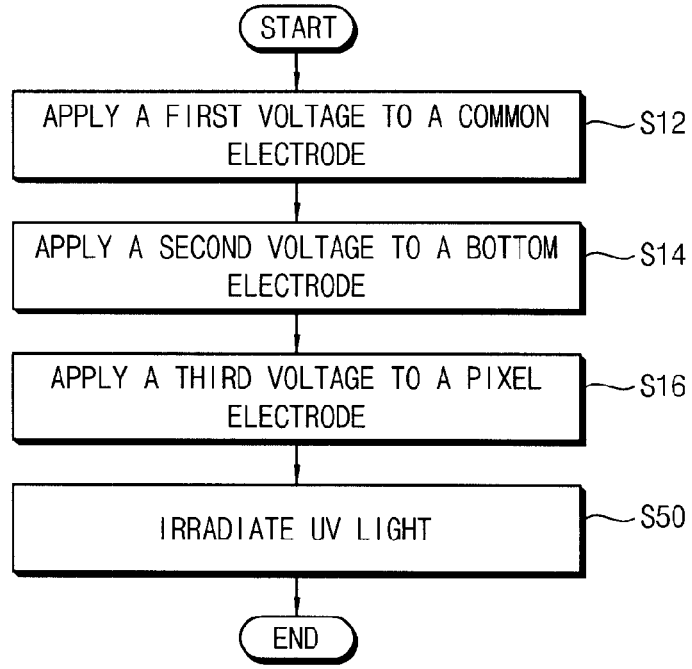
FIG. 20 is a flowchart showing a method of manufacturing the display device of FIG. 19B according to exemplary embodiments of the present invention.

FIG. 20 is a flowchart showing a method of manufacturing the display device of FIG. 19B.

Referring to FIG. 19B and FIG. 20, the first substrate 100 and the second substrate 200 may be assembled with each other, and a liquid crystal composition material may be disposed between the first and second substrates 100 and 200. The liquid crystal composition material may include a plurality of liquid crystal molecules 310 and a plurality of RM monomers 330 (refer to FIG. 3E).

When the liquid crystal composition material is disposed between the first and second substrate 100 and 200, a first voltage Vcom may be applied to the common electrode 250 (step S12), and a second voltage Vb1 may be applied to the bottom electrode BE (step S14).

In some cases, the first voltage Vcom may be about 0 V. The second voltage Vb1 may be higher than the first voltage Vcom. In some cases, the second voltage Vb1 may range from about 7 V to about 16 V. The bottom electrode BE may receive the second voltage Vb1 through the storage line STL. An electric field may be generated between the first and second substrates 100 and 200 due to the applied first voltage Vcom and second voltage Vb1. Due to the electric field, a long axis of the liquid crystal molecules 310 may be arranged in a perpendicular direction (e.g., perpendicular to the electric field).

Then, a third voltage Vdata may be applied to the pixel electrode PE (step S16). The third voltage Vdata may be higher than the first voltage Vcom and may be lower than the second voltage Vb1. The third voltage Vdata may be a positive polarity voltage or a negative polarity voltage. For example, the third voltage Vdata may be about 5 V.

When the liquid crystal molecules 310 are pretilted by using the first to third voltages Vcom, Vb1 and Vdata, UV light is irradiated onto the first and second substrates 100 and 200 (step S50). The RM monomers 330 may be reactive to the UV light and may be polymerized. The polymerized RM curing material 320 (refer to FIG. 19B) may be formed, the liquid crystal molecules 310 may be fixed adjacent to the pixel electrode PE and/or the common electrode 250, and the liquid crystal molecules 310 may be pretilted by the RM curing material 320.

As described above, the second voltage Vb1 may be higher than the third voltage Vdata applied to the pixel electrode PE and may be provided to the bottom electrode BE, so that the liquid crystal molecules 310 disposed in an area adjacent to the opening pattern 162 may be stably arranged using a strong electric field. Therefore, the liquid crystal layer 300 according to the Example 7 may be formed.

According to the description of the display device in Example 6, an aperture ratio of the pixel area P may be increased, and a viewing angle may be enhanced. Moreover, the reliability of a manufacturing process may be enhanced and a manufacturing process may be simplified, so that the productivity of the display device may be enhanced.

Hereinafter, another method of manufacturing a display device according the present embodiment may be explained in detail with reference to FIG. 19A, FIG. 19B, and FIG. 21. Steps for manufacturing the first and second substrates 100 and 200 according to the some exemplary embodiments are substantially the same as the steps for manufacturing the first and second substrates according to Example 7, respectively, and thus any repetitive detailed explanation may be hereinafter omitted.

Figure 21:
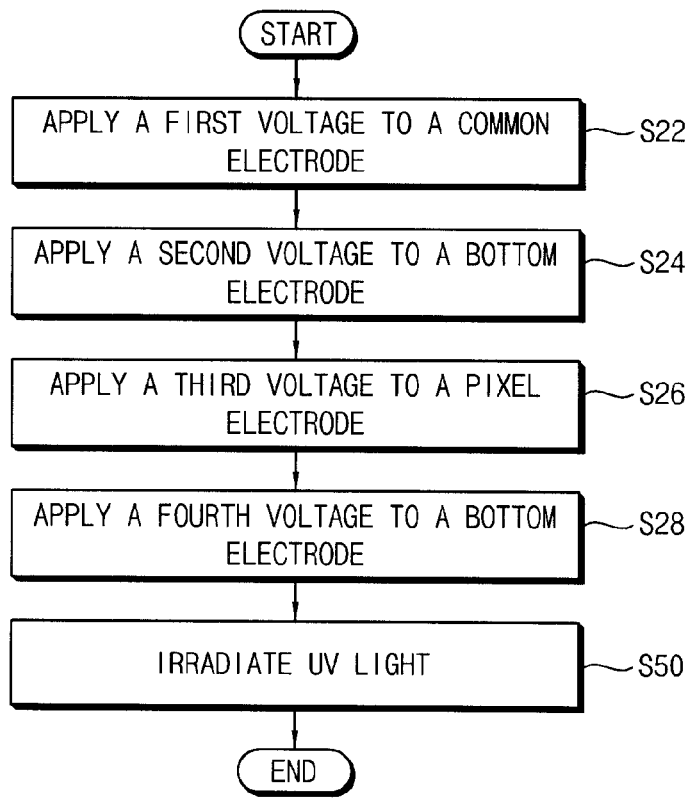
FIG. 21 is a flowchart showing a method of manufacturing a display device according to exemplary embodiments of the present invention.

Referring to FIG. 19A, FIG. 19B, and FIG. 21, the first substrate 100 and the second substrate 200 may be respectively manufactured and assembled with each other. A liquid crystal composition material may be disposed between the first and second substrates 100 and 200. The liquid crystal composition material may include a plurality of liquid crystal molecules 310, and a plurality of RM monomers 330 (refer to FIG. 3E).

FIG. 21 is a flowchart showing a method of manufacturing a display device according to exemplary embodiments of the present invention.

Referring to FIG. 21, when the liquid crystal composition material is disposed between the first substrate 100 and the second substrate 200, a first voltage Vcom may be applied to the common electrode 250 (step S22), and a second voltage Vb1 may be applied to the bottom electrode BE (step S24). The second voltage Vb1 may be higher than the first voltage Vcom. The second voltage Vb1 may be provided to the bottom electrode BE through the storage line STL.

An electric field may be generated between the first and second substrates 100 and 200 due to the applied first voltage Vcom and second voltage Vb1. Due to the electric field, a long axis of the liquid crystal molecules 310 may be arranged in a perpendicular direction (e.g., perpendicular to the electric field).

A third voltage Vdata may then be applied to the pixel electrode PE (step S26). The third voltage Vdata may be higher than the first voltage Vcom and may be lower than the second voltage Vb1. Even though the third voltage Vdata may be applied to the pixel electrode PE, a strong electric field may form adjacent to the opening pattern 162, so that an arrangement of liquid crystal molecules 310 disposed adjacent to the opening pattern 162 may not vary in comparison to an arrangement in which just the first voltage Vcom and the second voltage Vb1 are applied. In some cases, the first, second, and third voltages Vcom, Vb1, and Vdata may employ a positive polarity voltage or a negative polarity voltage. In some cases, the first, second, and third voltages Vcom, Vb1, and Vdata may employ a DC voltage or an AC voltage.

A fourth voltage Vb2 may be applied to the bottom electrode BE (step S28). The fourth voltage Vb2 may be greater than the first, second, and third voltages Vcom, Vb1, and Vdata. The fourth voltage Vb2 may be, for example, about 25 V. Thus, a strong electric field is formed between the common electrode 250 and the bottom electrode BE when the fourth voltage Vb2 is applied, and a long axis of the liquid crystal molecules 310 may be perpendicular to the electric field direction due to the electric field formed between the common electrode 250 and the bottom electrode BE.

When the liquid crystal molecules 310 are pretilted using the first to fourth voltages Vcom, Vb1, Vdata, and Vb2, UV light may be irradiated onto the first and second substrates 100 and 200 (step S50). Due to the UV light, the RM monomers may react to light and may be polymerized. Thus, the polymerized RM curing material 320 (refer to FIG. 19B) may be formed, and the liquid crystal molecules 310 may be fixed adjacent to the pixel electrode PE and/or the common electrode 250 in a state in which the liquid crystal molecules 310 are pretilted by the RM curing material 320.

As described above, the second voltage Vb1 and the fourth voltage Vb2 may be supplied to the bottom electrode BE so that the liquid crystal molecules 310 disposed in an area adjacent to the opening pattern 163 may be stably arranged in a strong electric field. The third voltage Vdata may be applied to the bottom electrode BE before the fourth voltage Vb2 is applied to the bottom electrode BE, so that rapid movement of the liquid crystal molecules 310 may be prevented. Accordingly, the liquid crystal molecules 310 disposed in an area adjacent to the opening pattern 163 may be stably arranged in a strong electric field.

Although not shown in FIG. 21, irradiation of UV light onto the first substrate 100 and the second substrate 200 may be further performed before the fourth voltage Vb2 is applied to the bottom electrode BE. UV light may be irradiated onto the first and second substrates 100 and 200 to partially react and polymerize the RM monomers 330 before the fourth voltage Vb2 is applied thereto. The UV light may again be irradiated thereto after the fourth voltage Vb2 is applied thereto, so that the RM monomers 330 may be fully polymerized.

According to the description of the display device in Example 7, an aperture ratio of the pixel area P may be increased, and a viewing angle may be enhanced. For example, liquid crystal molecules 310 of the liquid crystal layer 300 may be stably pretilted. Thus, the reliability of a manufacturing process may be enhanced and a manufacturing process may be simplified, so that the productivity of the display device may be enhanced.

EXAMPLE 8

Figure 22:
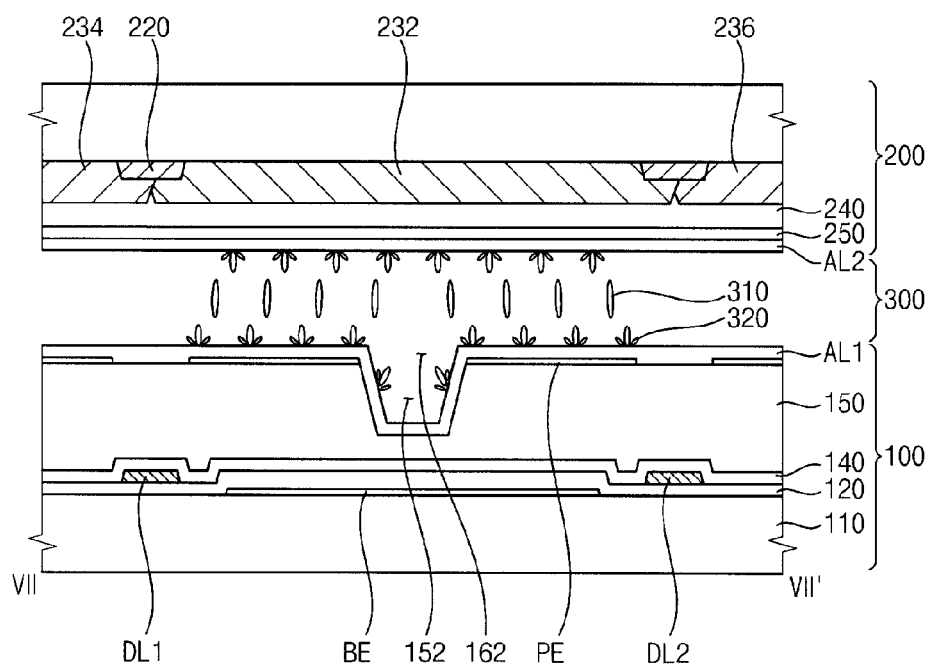
FIG. 22 is a cross-sectional view illustrating a display device according to exemplary embodiments of the present invention.

FIG. 22 is a cross-sectional view illustrating a display device according to some exemplary embodiments of the present invention.

In FIG. 22, the display device may be substantially the same as the display device described with reference to FIG. 18, FIG. 19A, and FIG. 19B except for a depression pattern 152 in the domain-forming layer 150, and thus any repetitive detailed explanation may hereinafter be omitted.

Referring to FIG. 22, a display device may include a first substrate 100, a second substrate 200, and a liquid crystal layer 300.

The first substrate 100 may include a bottom electrode BE, a gate insulation layer 120, first and second data lines DL1 and DL2, a passivation film 140, a domain-forming layer 150, a pixel electrode PE, and a first alignment layer AL1.

The domain-forming layer 150 may include a depression pattern 152 having a dot shape formed in a pixel area P. The domain-forming layer 150 may be removed by a predetermined thickness, so that the depression pattern 152 may be formed. The depression pattern 152 may form a liquid crystal domain in the pixel area P.

The pixel electrode PE may include an opening pattern 162 having a dot shape. The opening pattern 162 may be formed in an area corresponding to the depression pattern 152. The first alignment layer AL1 may be formed on the pixel electrode PE and may contact the depression pattern 152 through the opening pattern 162. The opening pattern 162 and the depression pattern 152 may form a liquid crystal domain on the pixel area P.

The second substrate 200 and the liquid crystal layer 300 may be substantially the same as the second substrate and the liquid crystal layer described in FIG. 18, FIG. 19A, and FIG. 19B, and thus any repetitive detailed explanation may hereinafter be omitted.

The display device according to Example 8 may be manufactured using the same manufacturing method described with reference to Example 7 except for forming the depression pattern 152 on the domain-forming layer 150.

According to the description of the display device in Example 8, an aperture ratio of the pixel area P may be increased, and a viewing angle may be enhanced. Moreover, liquid crystal molecules 310 of the liquid crystal layer 300 may be stably pretilted. Thus, the reliability of a manufacturing process may be enhanced and a manufacturing process may be simplified, so that the productivity of the display device may be enhanced.

EXAMPLE 9

Figure 23:
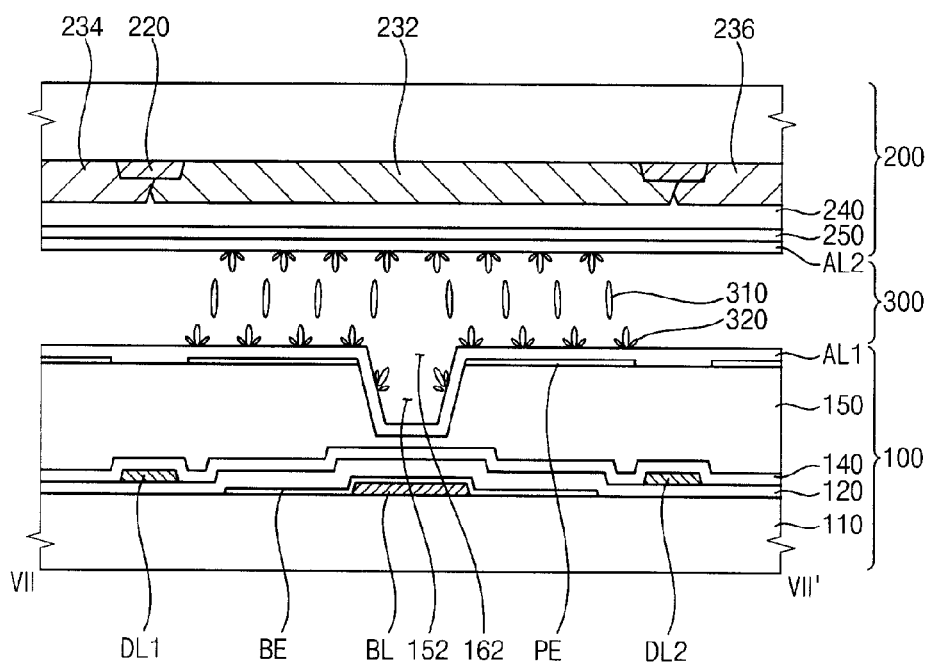
FIG. 23 is a cross-sectional view illustrating a display device according to exemplary embodiments of the present invention.

FIG. 23 is a cross-sectional view illustrating a display device according to some exemplary embodiments of the present invention.

In FIG. 23, the display device may be substantially the same as the display device described with reference to FIG. 22 except for a light-blocking pattern BL in a first substrate 100. Any repetitive detailed explanation may hereinafter be omitted.

Referring to FIG. 23, a display device may include a first substrate 100, a second substrate 200, and a liquid crystal layer 300.

The first substrate 100 may include a light-blocking pattern BL, a bottom electrode BE, a gate insulation layer 120, first and second data lines DL1 and DL2, a passivation film 140, a domain-forming layer 150, a pixel electrode PE, and a first alignment layer AL1.

The light-blocking pattern BL may be formed by patterning a gate metal layer that may be identical to a metal layer forming the first and second gate lines GL1 and GL2. The light-blocking pattern BL may prevent light leakage, which may be due to an opening pattern 162 of the domain-forming layer 150 and an opening pattern 162 of the pixel electrode PE. The light-blocking pattern BL may be formed in an area corresponding to the depression pattern 152 and the opening pattern 162.

The second substrate 200 and the liquid crystal layer 300 may be substantially the same as the second substrate and the liquid crystal layer described with reference to FIG. 18, FIG. 19A, and FIG. 19B, and thus any repetitive detailed explanation may hereinafter be omitted.

The display device according to Example 9 may be manufactured using the same manufacturing method as described for manufacturing the display device according to Example 7 except for formation of the depression pattern 152 on the domain-forming layer 150.

In FIG. 23, the light-blocking pattern BL may be formed from the gate metal layer; however, the light-blocking pattern BL may be formed on the gate insulation layer 120 by patterning a source metal layer forming the first and second data lines DL1 and DL2. In some cases, the light-blocking pattern BL may be formed from a layer identical to a black matrix pattern 220 formed on the second substrate 200.

According to the description of the display device in Example 9, the aperture ratio of the pixel area P may be increased, and a viewing angle may be enhanced. For example, liquid crystal molecules 310 of the liquid crystal layer 300 may be stably pretilted. Thus, the reliability of a manufacturing process may be enhanced and a manufacturing process may be simplified, so that the productivity of the display device may be enhanced.

As described in detail, since a liquid crystal domain may be formed without a separate pattern on a common electrode, a display device having an enhanced aperture ratio and an enhanced viewing angle may be manufactured. Moreover, since a separate pattern is not formed on the common electrode, a misalignment cause of the first and second substrates may be removed in principle so that a manufacturing process of a display device may have enhanced reliability. Furthermore, since a separate patterning process for patterning the common electrode is omitted, a manufacturing process of the display device may be simplified. Therefore, the display device having enhanced productivity and display quality may be manufactured. The foregoing is illustrative of the present invention and is not to be construed as limiting thereof.

Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display device, comprising:
    a first substrate comprising a pixel electrode and a domain-forming layer comprising a depression pattern, the depression pattern providing a liquid crystal domain in a pixel area;
    a second substrate facing the first substrate, the second substrate comprising a common electrode; and
    a liquid crystal layer disposed between the first substrate and the second substrate, the liquid crystal layer comprising a reactive mesogen (RM) to fix liquid crystal molecules in the liquid crystal domain,
    wherein the first substrate further comprises a bottom electrode formed under the domain-forming layer of the pixel area, the bottom electrode directly contacting a storage line.

2. The display device of claim 1, wherein the first substrate comprises a switching element comprising a contact electrode electrically connected to the pixel electrode, and
    wherein the depression pattern exposes the contact electrode.

3. The display device of claim 2, wherein the storage line overlaps the contact electrode.

4. The display device of claim 1, wherein the domain-forming layer comprises at least one color filter.

5. The display device of claim 1, wherein the domain-forming layer further comprises a contact hole exposing the contact electrode, the contact electrode contacting the pixel electrode.

6. The display device of claim 1, wherein the bottom electrode comprises a transmissive electrode layer.

7. The display device of claim 1, wherein the storage line directly contacts an end portion of the bottom electrode.

8. A display device, comprising:
    a first substrate comprising a domain-forming layer and a pixel electrode having an opening pattern to form a liquid crystal domain in a pixel area;
    a second substrate facing the first substrate, the second substrate comprising a common electrode; and
    a liquid crystal layer disposed between the first substrate and the second substrate, the liquid crystal layer comprising a reactive mesogen to fix liquid crystal molecules in the liquid crystal domain,
    wherein the first substrate further comprises a bottom electrode formed under the domain-forming layer of the pixel area, the bottom electrode directly contacting a storage line.

9. The display device of claim 8, wherein the storage line directly contacting an end portion of the bottom electrode.

10. A method of manufacturing a display device, the method comprising:
- forming, on a first substrate, a domain-forming layer comprising a depression pattern, the depression pattern providing a liquid crystal domain in a pixel area;
- forming a pixel electrode on the domain-forming layer;
- forming a common electrode on an entire surface of a second substrate;
- disposing a liquid crystal composition material comprising liquid crystal molecules and reactive mesogen monomers between the first substrate and the second substrate; and
- forming a liquid crystal layer by applying a light to the liquid crystal molecules and the reactive mesogen monomers disposed between the first substrate and the second substrate, wherein a first voltage is applied to the common electrode and a second voltage is applied to the pixel electrode while applying the light,
- wherein the first substrate further comprises a bottom electrode formed under the domain-forming layer of the pixel area, the bottom electrode directly contacting a storage line.

11. The method of claim 10, wherein forming the liquid crystal layer comprises:
- irradiating light to the first substrate and the second substrate, and
- wherein a magnitude of the second voltage is lower than a magnitude of the first voltage.

* * * * *